US011483793B2

(12) United States Patent
Agnihotri et al.

(10) Patent No.: US 11,483,793 B2
(45) Date of Patent: Oct. 25, 2022

(54) OPTIMIZED OBSERVED TIME DIFFERENCE OF ARRIVAL (OTDOA) IN LICENSED-ASSISTED ACCESS (LAA)

(71) Applicant: QUALCOMM Incorporated, San Diego, CA (US)

(72) Inventors: Hem Agnihotri, Benares (IN); Stephen William Edge, Escondido, CA (US); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/960,539

(22) Filed: Apr. 23, 2018

(65) Prior Publication Data
US 2019/0327706 A1 Oct. 24, 2019

(51) Int. Cl.
*H04W 16/14* (2009.01)
*H04W 64/00* (2009.01)
(Continued)

(52) U.S. Cl.
CPC ........ *H04W 64/003* (2013.01); *G01S 5/0236* (2013.01); *G01S 5/10* (2013.01);
(Continued)

(58) Field of Classification Search
CPC .......... H04W 4/02; H04W 8/02; H04W 16/14
See application file for complete search history.

(56) References Cited

U.S. PATENT DOCUMENTS

2012/0147796 A1 6/2012 Ishii et al.
2014/0295881 A1* 10/2014 Werner ............... H04W 4/023
455/456.1
(Continued)

FOREIGN PATENT DOCUMENTS

CN 107750437 A 3/2018

OTHER PUBLICATIONS

Soderini A.P., "Outdoor Positioning Algorithms Based on LTE and Wifi Measurements", Wireless Communications Circuits and Systems, Tampere University of Technology, Dec. 2016, 89 Pages.
(Continued)

*Primary Examiner* — Jinsong Hu
*Assistant Examiner* — Farideh Madani
(74) *Attorney, Agent, or Firm* — MG-IP Law, P.C.

(57) ABSTRACT

Disclosed are techniques for determining a location of a user equipment (UE) communicating over a shared communication medium in unlicensed spectrum. In an aspect, the UE measures a positioning reference signal (PRS) from a first evolved NodeB (eNB) for a first secondary cell (Scell) and a second PRS from a second eNB for a second Scell. The UE reports the first and second PRS measurements and the first and second PRS measurement times to a location server. In an aspect, the first and second PRS are configured according to a common PRS configuration. The location server also receives transmission times of the PRS signals from the first and second eNBs. Using the measurement and transmission times, the location server can associate the first PRS measurement to the first eNB and the second PRS measurement to the second eNB, thereby assisting the location server to obtain a location for the UE.

52 Claims, 13 Drawing Sheets

(51) Int. Cl.
*H04W 24/10* (2009.01)
*H04L 5/00* (2006.01)
*G01S 5/10* (2006.01)
*G01S 5/02* (2010.01)
*H04W 16/32* (2009.01)

(52) U.S. Cl.
CPC ........... *H04L 5/0048* (2013.01); *H04W 16/14* (2013.01); *H04W 24/10* (2013.01); *H04W 16/32* (2013.01)

(56) References Cited

U.S. PATENT DOCUMENTS

| | | | |
|---|---|---|---|
| 2015/0230112 A1 | 8/2015 | Siomina et al. | |
| 2016/0174109 A1* | 6/2016 | Yerramalli | H04W 28/26 370/329 |
| 2016/0205499 A1* | 7/2016 | Davydov | H04W 4/02 455/456.1 |
| 2016/0223641 A1 | 8/2016 | Cheng et al. | |
| 2017/0108579 A1* | 4/2017 | Irvine | G01S 5/08 |
| 2017/0150500 A1 | 5/2017 | Ahn et al. | |
| 2017/0238136 A1 | 8/2017 | Smith | |
| 2018/0048444 A1* | 2/2018 | Park | H04L 5/005 |
| 2018/0124787 A1* | 5/2018 | Wang | H04L 5/0048 |
| 2018/0375636 A1* | 12/2018 | You | H04L 5/0044 |
| 2019/0101615 A1* | 4/2019 | Tenny | G01S 5/10 |
| 2019/0132816 A1* | 5/2019 | Xue | H04W 64/00 |
| 2019/0149307 A1* | 5/2019 | Siomina | H04W 16/14 370/252 |
| 2019/0327707 A1 | 10/2019 | Agnihotri et al. | |

OTHER PUBLICATIONS

Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.eom/s/Qualcomm-OTDOA-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5; pp. 40-42, chapters 7.1.1-7.1.3.

International Search Report and Written Opinion—PCT/US2019/028575—ISA/EPO—dated Aug. 26, 2019.

LG Electronics: "Discussion on positioning technology utilizing unlicensed spectrum", 3GPP Draft; R1-151541, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20, 2015-Apr. 24, 2015, Apr. 19, 2015 (Apr. 19, 2015), XP050934413, 2 Pages, Retrieved from the Internet: URL:http://www.3gpp.org/ftp/Meetings_3GPP_SYNC/RAN1/Docs/ [retrieved on Apr. 19, 2015].

3GPP TS 36.355 V14.5.1(Apr. 2018)"3GPP TS 36.355 V14.5.1(Apr. 2018)3 Gen Partnership Project; Tech Spec Grp Radio Access Network;Evolved Uni Terrestrial Radio Access(E-UTRA)LTE Positioning Protocol(LPP)(Release 14)",3GPP Standard;Tech Spec;3GPP TS 36.355,3rd Gen Partnership Project (3GPP)Mobile Competence Centre;650,Route Des Lucioles;F-06921 Sophia-Antipolis Cedex;FR, vol. RAN WG2,No. V14.5.1,Apr. 3, 2018(Apr. 3, 2018)pp. 1-171, XP051450933[retrieved Apr. 3, 2018]pp. 19-24,chapters 5.1-5.3;pp. 48-73,chap 6.5.1 OTDOA Positioning.

3GPP TS 36.455 V14.4.0(Dec. 2017):"3GPP TS 36.455 V14.4.0 (Dec. 2017)3rd Gen Partnership Project;Tech Spec Sroup Radio Access Network;Evolved Universal Terrestrial Radio Access(E-UTRA);LTE Positioning Protocol A (LPPa) Release 14)"3GPP Standard; Tech Spec;3GPP TS 36.455,3rd Gen Partnership Project(3GPP)Mobile Competence Centre,650,Route Des Lucioles;F-06921 Sophia-Antipolis Cedex ;FR, vol. RAN WG3, No. V14.4.0, Jan. 12, 2018 (Jan. 12, 2018)p. 1-75,XP051392647[retrieved Jan. 12, 2018]p. 15,chap 8.2.5;p. 22-23,chap 9.1 1.8;pp. 29-31,chap 9.2.7.

Qualcomm Inc: "Support for Multiple Serving Cells in Lpp", 3GPP draft, 3GPP TSG-RAN WG2#76, R2-116331, Support for Multiple Serving Cells in LPP, 3rd Gen Partnership Project (3GPP), Mobile Competence Centre, 650, Route Des Lucioles, F-06921 Sophia-Antipolis Cedex, FR, vol. RAN WG2. No. San Francisco, CA, USA, Nov. 14, 2011-Nov. 18, 2011, Nov. 7, 2011(Nov. 7, 2011), XP050564224, pp. 1-24, [retrieved Nov. 7, 2011], p. 1, Chapter 1, Introduction, pp. 2-4, Chapter 2.2.1, URL: http://www.3gpp.org/ftp/tsg_ran/WG2_RL2/TSGR2_76/Docs/R2-116331.zip.

Taiwan Search Report—TW108113999—TIPO—dated May 6, 2022.
Taiwan Search Report—TW108113973—TIPO—dated Apr. 26, 2022.

* cited by examiner

OPTIMIZED OBSERVED TIME DIFFERENCE OF ARRIVAL (OTDOA) IN LICENSED-ASSISTED ACCESS (LAA)

INTRODUCTION

Aspects of this disclosure relate generally to telecommunications, and more particularly to determining a position of a user equipment (UE) communicating over a shared communication medium in unlicensed spectrum.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) and LTE Advanced (LTE-A) provided by the Third Generation Partnership Project (3GPP), Ultra Mobile Broadband (UMB) and Evolution Data Optimized (EV-DO) provided by the Third Generation Partnership Project 2 (3GPP2), WiFi (also referred to as Wi-Fi) 802.11 provided by the Institute of Electrical and Electronics Engineers (IEEE), etc.

A fifth generation mobile standard (referred to as 5G New Radio (NR)) will enable higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current LTE standard. Furthermore, signaling efficiencies should be enhanced and latency should be substantially reduced compared to current standards.

In cellular networks, "macro cell" access points (APs) provide connectivity and coverage to a large number of users over a certain geographical area. A macro network deployment is carefully planned, designed, and implemented to offer good coverage over the geographical region. To provide higher data transfer speeds, greater numbers of connections, and better coverage, for example, additional "small cell," typically low-power, access points have recently begun to be deployed to supplement conventional macro networks. Small cell access points may also provide incremental capacity growth, richer user experience, and so on. Small cell operations for LTE networks, for example, have been extended into the unlicensed frequency spectrum, such as the Unlicensed National Information Infrastructure (U-NII) band used by Wireless Local Area Network (WLAN) technologies. This extension of small cell LTE operations is designed to increase spectral efficiency and hence capacity of LTE systems.

Licensed-Assisted Access (LAA), standardized by 3GPP, provides operators and consumers with an additional mechanism to utilize unlicensed spectrum for improved user experience, while coexisting with WLAN and other technologies in the 5 GHz unlicensed band. LAA is a technique in which an LTE licensed band is used as an anchor to combine a licensed band and an unlicensed band by the use of carrier aggregation (CA). In LAA, a UE first accesses a network in the licensed band via, for example, a macro cell eNode B (eNB); the macro cell eNB may then offload traffic on the licensed band to the unlicensed band (e.g., onto one or more small cells acting as "secondary" cells) by instructing the UE to combine the licensed band and the unlicensed band via carrier aggregation.

Positioning of a UE with access to a wireless network employing unlicensed spectrum (e.g., an LTE or future 5G network) may be beneficial or even critical to support certain applications, such as emergency calls, personal navigation, direction finding, person finding, asset tracking, etc. Because the coverage of a small cell access point utilizing LAA is small, the accuracy of position methods that rely on signal measurement by a UE from access points for small cells, such as Observed TimeDifference of Arrival (OTDOA), can be increased compared with positioning using measurements of signals for cells with larger coverage. Thus, when LAA is available, it may provide an improved means of positioning a UE. In addition, LAA may be especially beneficial to 5G technology, as it allows for the high data rate requirements of the exponentially growing number of users of 5G. However, access points for small cells that use LAA may transmit signals for location measurements (e.g., a Positioning Reference Signal (PRS)) that are less precisely coordinated and synchronized than signals (e.g., PRS) transmitted for macro cells which may impede the usage of small cells for accurate and reliable location. Means to improve or optimize positioning using signals transmitted by small cells using LAA may therefore be desirable.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for assisting a position determination of a UE communicating over a shared communication medium in unlicensed spectrum includes measuring, by the UE at a first PRS measurement time during a first positioning occasion, a first PRS from a first eNB for a first secondary cell of a plurality of secondary cells, wherein the first eNB transmits the first PRS on the shared communication medium, and wherein the first PRS is configured according to a PRS configuration, measuring, by the UE at a second PRS measurement time during a second positioning occasion, a second PRS from a second eNB for a second secondary cell of the plurality of secondary cells, wherein the second eNB transmits the second PRS on the shared communication medium, and wherein the second PRS is configured according to the PRS configuration, and reporting, by the UE, the measurement of the first PRS, the measurement of the second PRS, the first PRS measurement time, and the second PRS measurement time to a location server.

In an aspect, a method for determining a position of a UE communicating over a shared communication medium in unlicensed spectrum includes receiving, at a location server from a first eNB for a first secondary cell of a plurality of secondary cells, a first PRS transmission time at which the first eNB transmitted a first PRS, wherein the first eNB transmits the first PRS on the shared communication medium according to a PRS configuration, receiving, at the location server from a second eNB for a second secondary cell of the plurality of secondary cells, a second PRS transmission time at which the second eNB transmitted a second PRS, wherein the second eNB transmits the second PRS on the shared communication medium according to the PRS configuration, receiving, at the location server from the UE, a first measurement of the first PRS, a second measurement of the second PRS, a first PRS measurement time at which the first measurement was taken, and a second PRS measurement time at which the second measurement was taken, determining, by the location server, that the UE measured the first PRS from the first eNB and the second PRS from the second eNB based on the first PRS measurement time, the second PRS measurement time, the first PRS transmission time, and the second PRS transmission time, and determining, by the location server, the position of the UE based at least in part on the first measurement, the second measurement, a location of the first eNB, and a location of the second eNB.

In an aspect, a method for assisting a position determination of a UE communicating over a shared communication medium in unlicensed spectrum includes transmitting, by an eNB for a secondary cell, a PRS on the shared communication medium at a positioning occasion according to a PRS configuration, and sending, by the eNB to a location server, a PRS transmission time at which the eNB transmitted the PRS.

In an aspect, an apparatus for assisting a position determination of a UE communicating over a shared communication medium in unlicensed spectrum includes at least one processor of the UE configured to: measure, at a first PRS measurement time during a first positioning occasion, a first PRS from a first eNB for a first secondary cell of a plurality of secondary cells, wherein the first eNB transmits the first PRS on the shared communication medium, and wherein the first PRS is configured according to a PRS configuration, measure, at a second PRS measurement time during a second positioning occasion, a second PRS from a second eNB for a second secondary cell of the plurality of secondary cells, wherein the second eNB transmits the second PRS on the shared communication medium, and wherein the second PRS is configured according to the PRS configuration, and cause a transceiver of the UE to report the measurement of the first PRS, the measurement of the second PRS, the first PRS measurement time, and the second PRS measurement time to a location server.

In an aspect, an apparatus for determining a position of a UE communicating over a shared communication medium in unlicensed spectrum includes a communication device of a location server configured to: receive, from a first eNB for a first secondary cell of a plurality of secondary cells, a first PRS transmission time at which the first eNB transmitted a first PRS, wherein the first eNB transmits the first PRS on the shared communication medium according to a PRS configuration, receive, from a second eNB for a second secondary cell of the plurality of secondary cells, a second PRS transmission time at which the second eNB transmitted a second PRS, wherein the second eNB transmits the second PRS on the shared communication medium according to the PRS configuration, and receive, from the UE, a first measurement of the first PRS, a second measurement of the second PRS, a first PRS measurement time at which the first measurement was taken, and a second PRS measurement time at which the second measurement was taken, and at least one processor of the location server configured to: determine that the UE measured the first PRS from the first eNB and the second PRS from the second eNB based on the first PRS measurement time and the second PRS measurement time received from the UE and the first PRS transmission time and the second PRS transmission time received from the first eNB and the second eNB, and determine the position of the UE based at least in part on the first measurement, the second measurement, a location of the first eNB, and a location of the second eNB.

In an aspect, an apparatus for assisting a position determination of a UE communicating over a shared communication medium in unlicensed spectrum includes a transceiver of an eNB for a secondary cell configured to: transmit a PRS on the shared communication medium at a positioning occasion according to a PRS configuration, and send, to a location server, a PRS transmission time at which the eNB transmitted the PRS.

In an aspect, a UE apparatus for assisting a position determination of a UE communicating over a shared communication medium in unlicensed spectrum includes a means for measuring, at a first PRS measurement time during a first positioning occasion, a first PRS from a first eNB for a first secondary cell of a plurality of secondary cells, wherein the first eNB transmits the first PRS on the shared communication medium, and wherein the first PRS is configured according to a PRS configuration, means for measuring, at a second PRS measurement time during a second positioning occasion, a second PRS from a second eNB for a second secondary cell of the plurality of secondary cells, wherein the second eNB transmits the second PRS on the shared communication medium, and wherein the second PRS is configured according to the PRS configuration; and means for reporting the measurement of the first PRS, the measurement of the second PRS, the first PRS measurement time, and the second PRS measurement time to a location server.

In an aspect, a location server apparatus for determining a position of a UE communicating over a shared communication medium in unlicensed spectrum includes means for receiving, from a first eNB for a first secondary cell of a plurality of secondary cells, a first PRS transmission time at which the first eNB transmitted a first PRS, wherein the first eNB transmits the first PRS on the shared communication medium according to a PRS configuration, means for receiving, from a second eNB for a second secondary cell of the plurality of secondary cells, a second PRS transmission time at which the second eNB transmitted a second PRS, wherein the second eNB transmits the second PRS on the shared communication medium according to the PRS configuration, means for receiving, from the UE, a first measurement of the first PRS, a second measurement of the second PRS, a first PRS measurement time at which the first measurement was taken, and a second PRS measurement time at which the second measurement was taken, means for determining that the UE measured the first PRS from the first eNB and the second PRS from the second eNB based on the first PRS transmission time, the PRS transmission second time, the first PRS measurement time, and the second PRS measurement time, and means for determining the position of the UE based at least in part on the first measurement, the second measurement, a location of the first eNB, and a location of the second eNB.

In an aspect, an eNB apparatus for a secondary cell for assisting a position determination of a UE communicating over a shared communication medium in unlicensed spectrum includes means for transmitting a PRS on the shared communication medium at a positioning occasion according to a PRS configuration, and means for sending, to a location server, a PRS transmission time at which the eNB transmitted the PRS.

In an aspect, a non-transitory computer-readable medium storing computer-executable instructions for assisting a position determination of a UE communicating over a shared communication medium in unlicensed spectrum includes computer-executable instructions comprising at least one instruction instructing the UE to measure, at a first PRS measurement time during a first positioning occasion, a first PRS from a first eNB for a first secondary cell of a plurality of secondary cells, wherein the first eNB transmits the first PRS on the shared communication medium, and wherein the first PRS is configured according to a PRS configuration, at least one instruction instructing the UE to measure, at a second PRS measurement time during a second positioning occasion, a second PRS from a second eNB for a second secondary cell of the plurality of secondary cells, wherein the second eNB transmits the second PRS on the shared communication medium, and wherein the second PRS is configured according to the PRS configuration, and at least one instruction instructing the UE to report the measurement of the first PRS, the measurement of the second PRS, the first PRS measurement time, and the second PRS measurement time to a location server.

In an aspect, a non-transitory computer-readable medium storing computer-executable instructions for determining a position of a UE communicating over a shared communication medium in unlicensed spectrum includes computer-executable instructions comprising at least one instruction instructing a location server to receive, from a first eNB for a first secondary cell of a plurality of secondary cells, a first PRS transmission time at which the first eNB transmitted a first PRS, wherein the first eNB transmits the first PRS on the shared communication medium according to a PRS configuration, at least one instruction instructing the location server to receive, from a second eNB for a second secondary cell of the plurality of secondary cells, a second PRS transmission time at which the second eNB transmitted a second PRS, wherein the second eNB transmits the second PRS on the shared communication medium according to the PRS configuration, at least one instruction instructing the location server to receive, from the UE, a first measurement of the first PRS, a second measurement of the second PRS, a first PRS measurement time at which the first measurement was taken, and a second PRS measurement time at which the second measurement was taken, at least one instruction instructing the location server to determine that the UE measured the first PRS from the first eNB and the second PRS from the second eNB based on the first PRS transmission time, the second PRS transmission time, the first PRS measurement time, and the second PRS measurement time, and at least one instruction instructing the location server to determine the position of the UE based at least in part on the first measurement, the second measurement, a location of the first eNB, and a location of the second eNB.

In an aspect, a non-transitory computer-readable medium storing computer-executable instructions for assisting a position determination of a UE communicating over a shared communication medium in unlicensed spectrum includes computer-executable instructions comprising at least one instruction instructing an eNB for a secondary cell to transmit a PRS on the shared communication medium at a positioning occasion according to a PRS configuration, and at least one instruction instructing the eNB to send, to a location server, a PRS transmission time at which the eNB transmitted the PRS.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
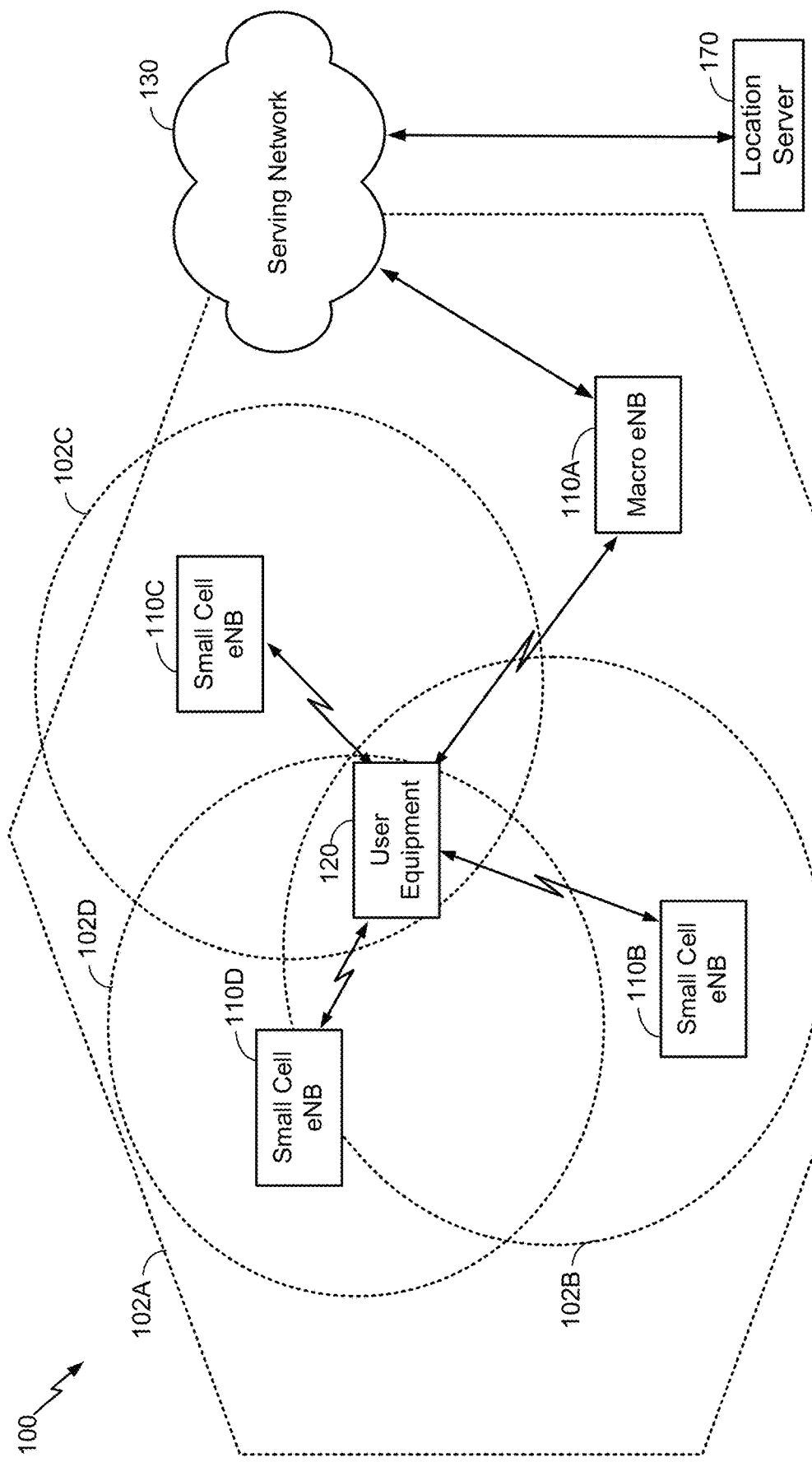
FIG. 1 illustrates an example mixed-deployment wireless communication system including macro cell eNode Bs and secondary cell eNode Bs according to at least one aspect of the disclosure.

Elements with like numbers or like labels in different figures are to be considered as corresponding to one another. Elements with a common numeric label followed by different alphabetic suffixes may correspond to different examples of a common type of element. Thus, for example, eNBs 110A, 110B, 110C and 110D in FIG. 1 are all particular examples of an eNB, which may be referred to as an eNB 110 when all the examples 110A-110D are applicable.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system 100, in which small cell evolved Node Bs (eNBs) 110B-110D are deployed in conjunction with and to supplement the coverage of a macro cell eNB 110A. As used herein, small cells generally refer to a class of low-powered base stations that may include or be otherwise referred to as femto cells, pico cells, micro cells, home base stations, Home eNBs (HeNBs), etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding eNB 110, which interacts with one or more UEs 120 via DownLink (DL) (e.g., a paging channel, a control channel, a broadcast channel, a forward traffic channel, etc.) and/or UpLink (UL) (e.g., a reverse traffic channel, a reverse control channel, an access channel, etc.) connections. In general, the DL corresponds to communication from an eNB 110 to a UE 120, while the UL corresponds to communication from a UE 120 to an eNB 110.

The UE 120 may be referred as a user equipment (UE), mobile device, mobile station, wireless terminal, wireless device, SUPL Enabled Terminal (SET) or by some other name. The UE 120 may correspond to a cell phone, smartphone, laptop, navigation device, tracking device, tablet, wearable, in-vehicle system or some other mobile or potentially mobile wireless capable entity.

The different eNBs 110 may provide LTE (or LTE-A) wireless access to UE 120 and include an example macro cell eNB 110A and three example small cell eNBs 110B-110D. The macro cell eNB 110A is configured to provide communication coverage within a macro cell coverage area 102A, which may cover a few blocks within a neighborhood or several square miles in a rural environment. Meanwhile, the small cell eNBs 110B-110D are configured to provide communication coverage within respective small cell coverage areas 102B-102D, with varying degrees of overlap existing among the different coverage areas. Note that although the eNBs 110 illustrated in FIG. 1 are referred to as eNBs and may provide LTE wireless access, the disclosure is not so limited and eNBs 110 may be replaced by (or may be assumed to correspond to) any type of access point. For example, they may correspond to NR NodeBs (gNBs) supporting 5G NR wireless access. In that case, references to OTDOA for LTE may be replaced by OTDOA for NR in the description below.

In an aspect, the macro cell eNB 110A may be a "primary cell" and the small cell eNBs 110B-110D may be "secondary cells" from the perspective of the UE 120. As is known in the art, "primary" and "secondary" cells are a concept related to carrier aggregation. In carrier aggregation, the primary cell is the cell operating on the primary frequency utilized by the UE 120 and is the cell in which the UE 120 either performs the initial Resource Radio Control (RRC) connection establishment procedure or initiates the RRC connection re-establishment procedure. In the example of FIG. 1, because the wireless communication system 100 utilizes LAA, the macro cell eNB 110A is the primary cell.

A secondary cell is a cell operating on a secondary frequency that may be configured once the RRC connection is established between the UE and the primary cell and that may be used to provide additional radio resources. As is known in the art, an eNB may have one or more (e.g., three) antennas or arrays of antennas, each corresponding to a sector, or cell. Thus, the term "cell," "secondary cell," "secondary cell eNB," or "SCell eNB" refers to a cell, or sector, of an eNB. For simplicity, the present disclosure assumes that an eNB has a single cell, and refers to an eNB and the corresponding cell interchangeably. However, as will be appreciated, the disclosure is not so limited. Further, as will be appreciated, because the small cell eNBs 110B-110D may be secondary cells, they may also be referred to herein as "secondary cell" eNBs 110B-110D, or SCell eNBs 110B-110D.

Turning to the illustrated connections in more detail, the UE 120 may transmit and receive messages via a wireless link with the macro cell eNB 110A, the message including information related to various types of communication (e.g., voice, data, multimedia services, associated control signaling, etc.). From time to time, the UE 120 may similarly communicate with one or more of the small cell eNBs 110B-110D via one or more other wireless links.

As is further illustrated in FIG. 1, the macro cell eNB 110A may communicate with a serving network 130, such as a Home Public Land Mobile Network (HPLMN) or a Visited Public Land Mobile Network (VPLMN), via a wired link or via a wireless link, while the small cell eNBs 110B-110D may also similarly communicate with the serving network 130 via their own wired or wireless links (not shown). For example, the small cell eNBs 110B-110D may communicate with the serving network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a packet cable carrying Internet Protocol (IP) traffic, a Broadband over Power Line (BPL) connection, an Optical Fiber (OF) cable, a satellite link, or some other link.

It will be appreciated that the macro cell eNB 110A and/or the small cell eNBs 110B-110D may be connected to the serving network 130 using any of a multitude of devices or methods. These connections may be referred to as the "backbone" or the "backhaul" of the network, and may, in some implementations, be used to manage and coordinate communications between the macro cell eNB 110A and/or the small cell eNBs 110B-110D. In this way, as a UE 120 moves through such a mixed communication network environment that provides both macro cell and small cell coverage, the UE 120 may be served in certain locations by macro cell eNBs, at other locations by small cell eNBs, and, in some scenarios, by both macro cell and small cell eNBs. As described with reference to FIG. 2, the various eNBs 110 may be referred to as the "RAN" and the backhaul connections to the serving network 130 may be to as a "core network" for the serving network 130.

For their wireless air interfaces, each eNB 110 may operate according to one of several radio access technologies (RATs) depending on the network in which it is deployed. These networks may include, for example, 5G millimeter wave (mmWave), Multiple Input, Multiple Output (MIMO), CDMA networks, TDMA networks, FDMA networks, OFDMA networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (WCDMA) and Low Chip Rate (LCR). cdma2000 covers IS-2000, IS-95 and IS-856 standards. A TDMA network may implement a RAT such as Global System for Mobile Communications (GSM). An OFDMA network may implement an RAT, such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from 3GPP. cdma2000 is described in documents from 3GPP2. These documents are publicly available.

A fifth generation (5G) mobile standard, referred to herein as "5G," "5G New Radio," or "5G NR," is expected to support higher data transfer speeds, greater numbers of connections, and better coverage, among other improvements. 5G NR radio access can be configured to utilize existing LTE infrastructure for mobility management or to operate in standalone or non-standalone mode with a new multi-access 5G Core Network (5GC). 5G is a unifying network concept that provides connectivity across diverse spectrum bands and radio access types. 5G expands spectrum usage to low-bands below 1 GHz, mid-bands between 1 GHz and 6 GHz, and high-bands generally above 24 GHz, (e.g., 5G mmWave). 5G also allows for access to licensed spectrum, shared spectrum, and unlicensed spectrum. Consequently, the discussion above with reference to FIG. 1, including systems using licensed spectrum, shared spectrum, and unlicensed spectrum is equally applicable to both 4G LTE and 5G NR.

Figure 2:
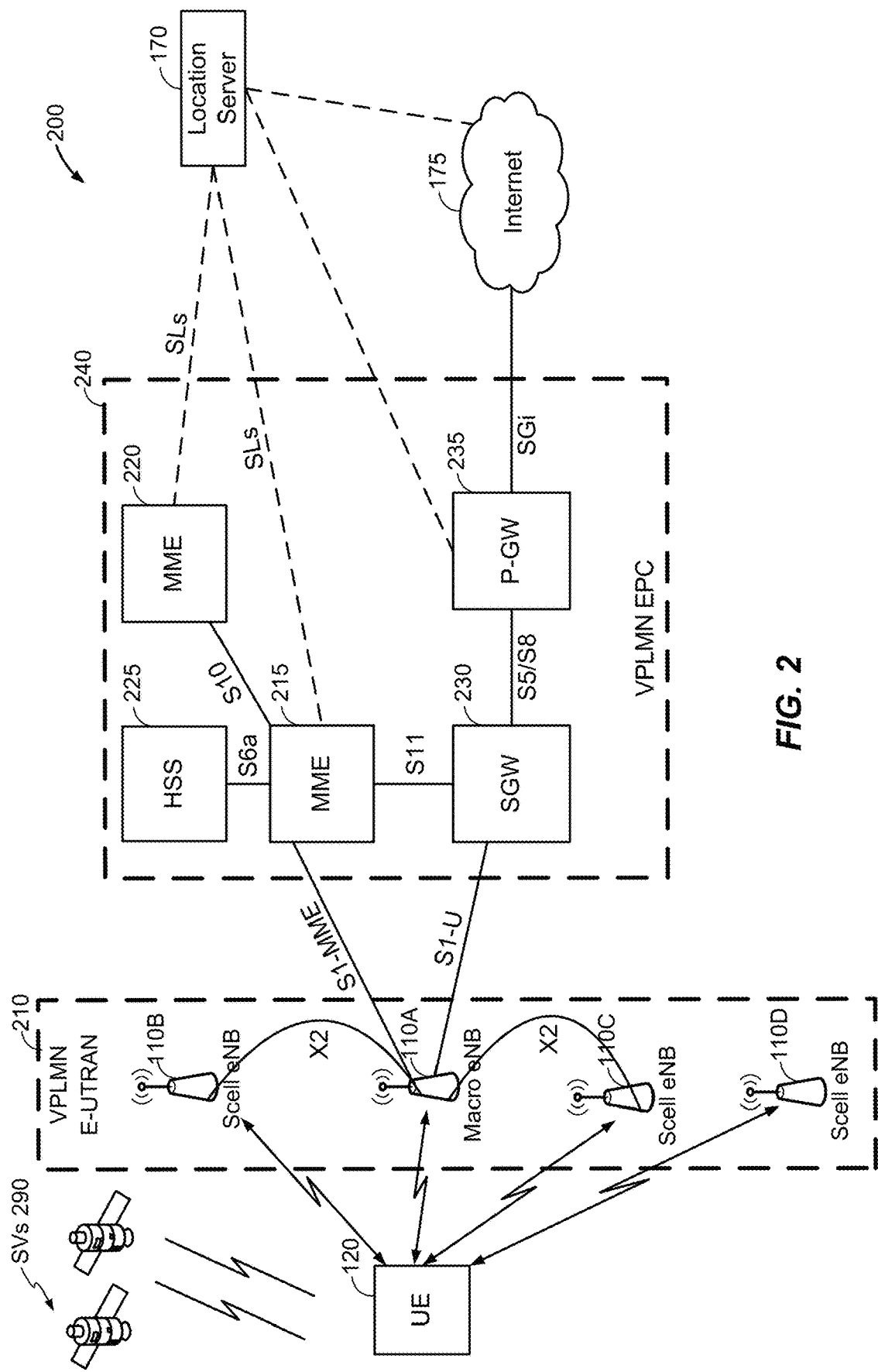
FIG. 2 illustrates an example configuration of a Radio Access Network (RAN) and a portion of a core network that is based on an Evolved Packet System (EPS), or LTE, network according to at least one aspect of the disclosure.

FIG. 2 illustrates an example configuration of a RAN 210 and a portion of a core network 240 of a communications system 200 based on an EPS or LTE network, in accordance with an aspect of the disclosure. Communication system 200 may be a particular example of communication system 100. Referring to FIG. 2, the RAN 210 (also referred to as VPLMN E-UTRAN 210) in the EPS/LTE network includes eNBs 110A-110D, which support LTE and/or other wireless access (e.g., NR), for example. In FIG. 2, the core network 240 (also referred as VPLMN Evolved Packet Core (EPC) 240) includes a plurality of Mobility Management Entities (MMEs) 215 and 220, a Home Subscriber Server (HSS) 225, a Serving Gateway (SGW) 230, and a Packet Data Network (PDN) Gateway (P-GW) 235. Network interfaces between these components, the RAN 210, and the Internet 175 are illustrated in FIG. 2 and are defined in Table 1 (below) as follows:

TABLE 1

EPS/LTE Interface Definitions

| Network Interface | Description |
|---|---|
| S1-MME | Reference point for the control plane protocol between RAN 210 and MME 215. |
| S1-U | Reference point between RAN 210 and SGW 230 for the per bearer user plane tunneling and inter-eNB path switching during handover. |
| S5 | Provides user plane tunneling and tunnel management between SGW 230 and P-GW 235. It is used for SGW relocation due to UE mobility and if the SGW 230 needs to connect to a non-collocated P-GW for the required Packet Data Network (PDN) connectivity. |
| S6a | Enables transfer of subscription and authentication data for authenticating/authorizing user access to the evolved system (Authentication, Authorization, and Accounting (AAA) interface) between MME 215 and HSS 225. |
| S8 | Inter-PLMN reference point providing user and control plane between the SGW 230 in a VPLMN and the P-GW 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the P-GW 235 and a packet data network, shown in FIG. 2 as the Internet 175. The packet data network may be an operator external public or private packet data network or an intra-operator packet data network (e.g., for provision of Internet Protocol (IP) Multimedia Subsystem (IMS) services). |
| SLs | Interface between an MME and the location server 170 in the event that location server 170 is or contains an Enhanced Serving Mobile Location Center (E-SMLC) |
| X2 | Reference point between two different eNBs used for UE handoffs. |

A high-level description of the components shown in FIG. 2 will now be provided. However, these components are each well-known in the art from various 3GPP Technical Specifications (TSs), such as TS 23.401, and the description contained herein is not intended to be an exhaustive description of all functionalities performed by these components.

Referring to FIG. 2, the eNBs 110A-110D are configured to provide LTE and/or 5G NR radio access to UE 120 and to provide signaling and voice/data connectivity between any UE 120 and elements in core network 240, such as MME 215 and SGW 230. The eNBs 110A-110D may also be configured to broadcast a PRS signal to nearby UEs 120 to enable any UE 120 to make measurements of PRS timing differences between pairs of eNBs 110 and thereby enable a location estimate of the UE 120 to be obtained by the UE 120 itself or by a location server (e.g., location server 170) to which the timing difference measurements may be sent using OTDOA positioning.

The term "location estimate" is used herein to refer to an estimate of a location for a UE 120, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "position estimate," a "fix estimate," or by some other term. The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as a "position method" or as a "positioning method."

Referring to FIG. 2, the MMEs 215 and 220 are configured to support network attachment of UE 120, mobility of UE 120, and bearer assignment to UE 120. MME functions include: Non-Access Stratum (NAS) signaling to UEs, NAS signaling security, mobility management for inter- and intra-technology handovers of UEs, P-GW and SGW selection, and MME selection for UE handovers with MME change.

Referring to FIG. 2, the SGW 230 is the gateway that terminates the user plane interface toward the RAN 210. For each UE 120 attached to the core network 240 for an EPS-based system, at a given point of time, there may be a single SGW 230. The functions of the SGW 230 include: mobility anchor point, packet routing and forwarding, and transport level packet marking in the uplink and the downlink (e.g., setting the DiffSery Code Point (DSCP) based on a Quality of Service (QoS) Class Identifier (QCI) of an associated EPS bearer).

Referring to FIG. 2, the P-GW 235 is the gateway that terminates the SGi user plane interface toward the PDN, e.g., the Internet 175. If a UE 120 is accessing multiple PDNs, there may be more than one P-GW for that UE 120. P-GW 235 functions include: packet filtering (e.g., using deep packet inspection), UE IP address allocation, transport level packet marking in the uplink and downlink (e.g., setting the DSCP based on the QCI of an associated EPS bearer), accounting for inter operator charging, UL and DL bearer binding, UL and DL rate enforcement and service level rate enforcement, and UL bearer binding. The P-GW 235 may provide PDN connectivity to both GSM/EDGE Radio Access Network (GERAN)/Universal Terrestrial Radio Access Network (UTRAN)-only UEs, and Enhanced UTRAN (E-UTRAN)-capable UEs using any of E-UTRAN, GERAN, or UTRAN. The P-GW 235 may provide PDN connectivity to E-UTRAN-capable UEs using E-UTRAN only over the S5/S8 interface.

Communication system, 200 may include satellite vehicles (SVs) 290 which may be part of a Global Navigation Satellite System (GNSS) such as the Global Positioning System (GPS), Galileo, GLONASS or Beidou. Measurement of navigation signals transmitted by SVs 290 may enable a location of UE 120 to be obtained either by UE 120 or by location server 170 if UE 120 sends the SV 290 measurements to location server 170.

In FIG. 2, the location server 170 is shown as connected to one or more of the Internet 175, the P-GW 235, MME 220, and MME 215. The connections to MME 215 and MME 220 are applicable when location server 170 is or contains an E-SMLC supporting the 3GPP control plane location solution for LTE access defined in 3GPP TS 23.271 and 3GPP TS 36.305. The connections to the Internet 175 and/or to the P-GW 235 are applicable when location server 170 is or contains a Secure User Plane Location (SUPL) Location Platform (SLP), such a Home SLP (H-SLP), Emergency SLP (E-SLP), or Discovered SLP (D-SLP), supporting the SUPL user plane location solution defined by the Open Mobile alliance (OMA). With a control plane location solution, the UE 120 and location server 170 may interact by exchanging messages using existing signaling interfaces and signaling protocols defined for normal operation of a wireless network. With a user plane location solution, UE 120 and location server 170 may interact by exchanging messages transferred as data from the perspective of a wireless network—e.g., using IP and TCP (Transmission Control Protocol). Location server 170 may be used (i) to obtain a location for UE 120 (e.g., from signal measurements obtained and transferred by UE 120) and/or (ii) to provide assistance data to UE 120 to enable UE 120 to acquire and measure signals (e.g., signals from one or more of eNBs 110A-110D and/or signals from one or more or SVs 290) and, in some cases, compute a location from these signal measurements. Examples of assistance data can be orbital and timing data for SVs 290 when Assisted GPS (A-GPS) or Assisted GNSS (A-GNSS) positioning is used, or information concerning downlink transmission from eNBs nearby to a UE 120 (e.g., any of eNBs 110A-110D) when OTDOA is used for positioning. When UE 120 accesses a 5G network (e.g., via a gNB replacing an eNB 110), location server 170 may correspond to a Location Management Function (LMF) in the event that a control plane location solution is used by the 5G network.

Figure 3:
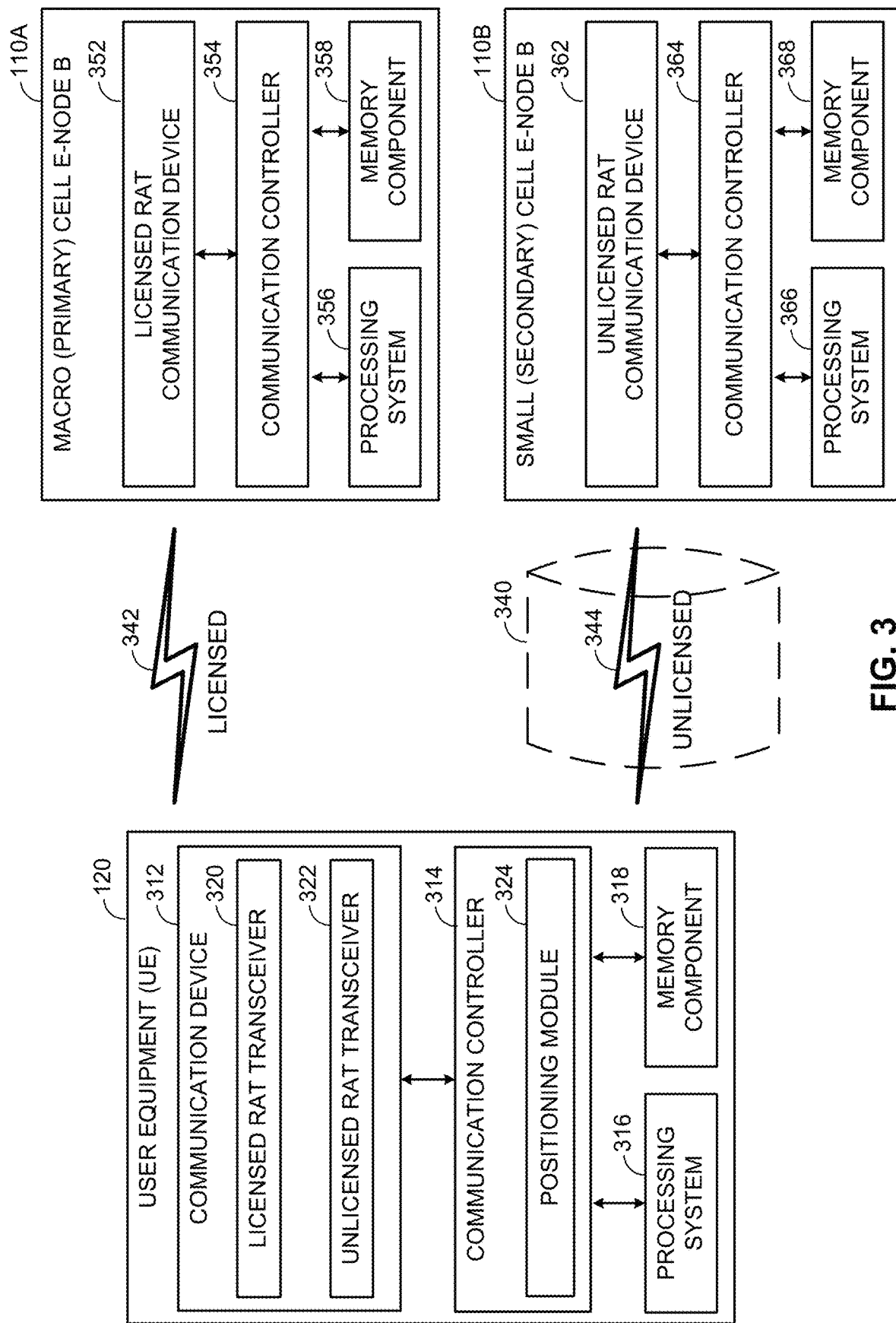
FIG. 3 illustrates an example wireless communication system including a macro cell eNode B and a secondary cell eNode B in communication with a UE according to at least one aspect of the disclosure.

FIG. 3 illustrates an example wireless communication system including a dual-mode UE in communication with two eNBs. In the example of FIG. 3, the UE 120 is in communication with a macro cell eNB 110A and a small cell eNB 110B. The UE 120 and the eNBs 110 each generally include a wireless communication device (represented by the communication devices 312, 352, and 362) for communicating with other network elements via at least one designated RAT. The communication devices 312, 352, and 362 may be variously configured for transmitting and encoding signals (e.g., messages, indications, information, and so on), and, conversely, for receiving and decoding signals (e.g., messages, indications, information, pilots, and so on) in accordance with the designated RAT. In some aspects, the communication devices 312, 352, and 362 may be implemented as a transceiver (a combination of transmitter and receiver circuitry), or as separate transmitter and receiver circuitry.

The UE 120 and the eNBs 110 may also each generally include a communication controller (represented by the communication controllers 314, 354, and 364) for controlling operation of their respective communication devices 312, 352, and 362 (e.g., directing, modifying, enabling, disabling, etc.). The communication controllers 314, 354, and 364 may operate at the direction of or otherwise in conjunction with respective host system functionality (illustrated as the processing systems 316, 356, and 366 and the memory components 318, 358, and 368). In some aspects, the processing systems 316, 356, and 366 may be implemented as one or more processors, one or more processor cores, a digital signal processor (DSP), an application-specific integrated circuit (ASIC), a field programmable gate array (FPGA), or the like. In some designs, the communication controllers 314, 354, and 364 may be partly or wholly subsumed by the respective host system functionality.

As will be described in more detail herein, the communication controller 314 includes a positioning module 324 that may perform, or cause the performance of, the UE operations for determining the position of the UE 120 as described herein. In an aspect, the positioning module 324 may be a software module storing instructions that, when executed by the processing system 316, cause the UE 120 to perform the UE operations described herein. In another aspect, the positioning module 324 may be a circuit that is part of or coupled to the processing system 316 that performs the UE operations described herein. In yet another aspect, the positioning module 324 may be a combination of hardware and software, such as a firmware component of the UE 120 or a modem for UE 120.

Further, although not illustrated in FIG. 3, the eNBs 110 may each include a positioning module that may perform, or cause the performance of, the eNB operations for determining a position of the UE 120 as described herein. In an aspect, such a positioning module may be a software module storing instructions that, when executed by the processing system 356/366, cause the eNB 110 to perform the eNB operations described herein. In another aspect, such a positioning module may be a circuit that is part of or coupled to the processing system 356/366 that performs the eNB operations described herein. In yet another aspect, such a positioning module may be a combination of hardware and software, such as a firmware component of the eNB 110.

Turning to the illustrated communication in more detail, the UE 120 may transmit and/or receive messages with the macro cell eNB 110A via a "primary" wireless link 342 in licensed spectrum. The UE 120 may also transmit and/or receive messages with the small cell eNB 110B via a "secondary" wireless link 344 in unlicensed spectrum. Thus, the small cell eNB 110B may also be referred to as a secondary cell eNB. The messages may include information related to various types of communication (e.g., voice, data, multimedia services, associated control signaling, etc.). In general, the macro cell eNB 110A may operate via the primary wireless link 342 in accordance with a licensed RAT (e.g., LTE). The small cell eNB 110B may operate via the secondary wireless link 344 in accordance with an unlicensed RAT (e.g., LTE-Unlicensed™, MulteFire™, WiFi™, etc.). The secondary wireless link 344 may operate over a common wireless communication medium of interest, shown by way of example in FIG. 3 as the wireless communication medium 340, which may be shared with still other communication systems and signaling schemes. A medium of this type may be composed of one or more frequency, time, and/or space communication resources (e.g., encompassing one or more channels across one or more carriers) associated with communication between one or more transmitter/receiver pairs.

As a particular example, the wireless communication medium 340 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the U-NII band used by WLAN technologies, most notably IEEE 802.11x WLAN technologies generally referred to as "WiFi" or as "Wi-Fi." Example systems of this type include different variants of CDMA systems, TDMA systems, FDMA systems, OFDMA systems, SC-FDMA systems, and so on.

In the example of FIG. 3, the communication device 312 of the UE 120 includes a licensed RAT transceiver 320 configured to operate in accordance with the licensed RAT of the macro cell eNB 110A and a co-located unlicensed RAT transceiver 322 configured to operate in accordance with the unlicensed RAT of the small cell eNB 110B. As an example, the licensed RAT transceiver 320 may operate in accordance with LTE technology and the unlicensed RAT transceiver 322 may operate in accordance with LTE Unlicensed (LTE-U) or WiFi technology. In some implementations, licensed RAT transceiver 320 and unlicensed RAT transceiver 322 may comprise the same transceiver. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

As briefly mentioned above, LAA is a technique in which an LTE licensed band (e.g., primary wireless link 342) is used as an anchor to combine the licensed band and an unlicensed band (e.g., secondary wireless link 344) by the use of carrier aggregation. Thus, in an aspect where the UE 120 and the eNBs 110 are configured to utilize LAA, the primary wireless link 342 (e.g., a licensed LTE band) may be used as an anchor and combined with the secondary wireless link 344 (e.g., an LTE unlicensed band) using carrier aggregation. Thus, when the UE 120 first accesses the network using the primary wireless link 342 (the licensed band), the macro cell eNB 110A can offload traffic on the primary wireless link 342 to the secondary wireless link 344 between the UE 120 and the small cell eNB 110B by using carrier aggregation to logically combine the primary wireless link 342 and the secondary wireless link 344.

Figure 4:
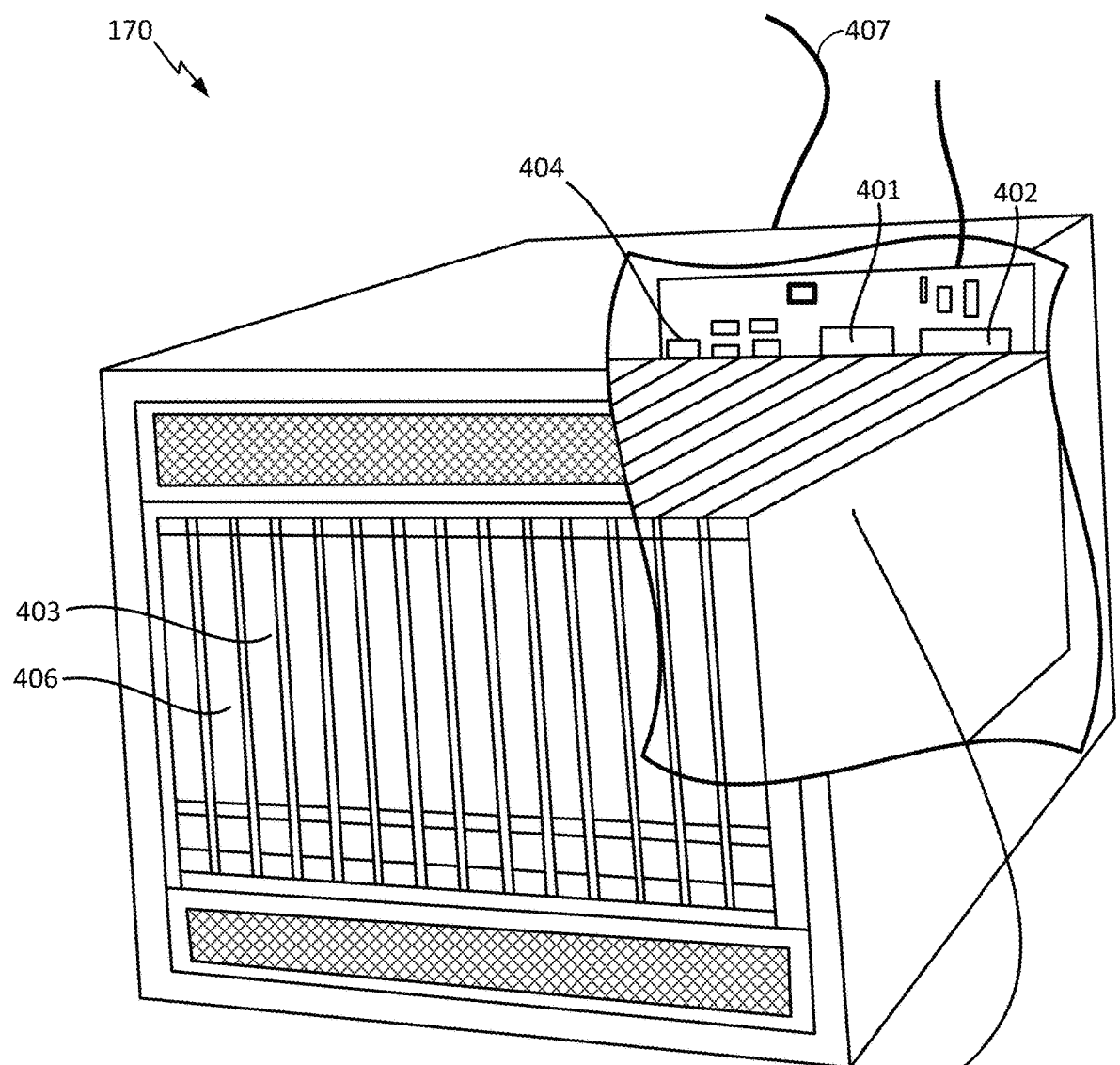
FIG. 4 illustrates an exemplary location server according to various aspects of the disclosure.
Figure 4:
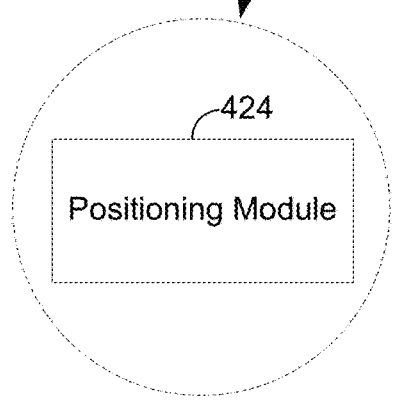

FIG. 4 illustrates an exemplary location server 170, using which various aspects of the disclosure may be implemented. In FIG. 4, the location server 170 includes a processing system 401 coupled to volatile memory 402 and a large capacity nonvolatile memory 403, such as a disk drive. The location server 170 may also include a floppy disc drive, compact disc (CD) or digital video disc (DVD) drive 406 coupled to the processing system 401. The location server 170 may also include a communication device 404, such as one or more network access ports, coupled to the processing system 401 for establishing data connections with a network 407, such as a local area network coupled to other broadcast system computers and servers, the Internet 175, or core network 240.

In an aspect, the volatile memory 402 or the nonvolatile memory 403 may include a positioning module 424 that may perform, or cause the performance of, the location server operations for determining a position of the UE 120 as described herein. In an aspect, the positioning module 424 may be a software module storing instructions that, when executed by the processing system 401, cause the location server 170 to perform the location server operations described herein. In another aspect, the positioning module 424 may be a circuit that is part of or coupled to the processing system 401 that performs the location server operations described herein. In yet another aspect, the positioning module 424 may be a combination of hardware and software, such as a firmware component of the location server 170.

A UE, e.g., UE 120, can typically support the measurement of the cells operating on an unlicensed band. Thus, based on the UE's automatic neighbor relation (ANR) table, the UE may know the adjacent neighbor cells that are operating on unlicensed band. This neighbor information is also stored at the location server 170, e.g., via pre-configuration using Operations & Maintenance (O&M) or via eNBs for the adjacent neighbor cells sending neighbor information to location server 170 (e.g., when requested by location server 170). The location server 170 can use this information to configure the UE 120 to measure a PRS of the neighboring secondary cell eNBs (e.g., secondary cell eNBs 110B-110D). For example, the location server 170 may send assistance data to the UE 120 (e.g., using the LTE Positioning Protocol (LPP) defined in 3GPP TS 36.355) comprising an identification of one or more of the neighboring secondary cell eNBs (e.g., secondary cell eNBs 110B-110D) and configuration information for a PRS (or multiple PRSs) transmitted by each neighboring secondary cell eNB, such as an occurrence (e.g., periodicity) of LTE subframes containing PRS, a number of consecutive subframes containing PRS in a PRS positioning occasion, a PRS bandwidth, PRS code sequence, PRS carrier frequency and frequency shift— e.g., as defined for OTDOA in 3GPP TS 36.355 and 3GPP TS 36.211. Further description of PRS signals, PRS positioning occasions, PRS configuration information and measurement by a UE 120 of PRS signals (e.g., transmitted by eNBs 110) is provided later in association with FIGS. 12 and 13.

Since transmission in LAA may be based on listen-before talk (LBT), secondary cell eNBs operating on an unlicensed band may need to perform LBT before PRS transmission. Since an LAA secondary cell's coverage is small, the accuracy of OTDOA measurements by a UE 120 for LAA cells may be increased compared to cells with larger coverage areas.

At a given time, it is not guaranteed that a secondary cell (e.g., any of eNBs 110B-110D) will have access to the shared medium (e.g., wireless communication medium 340) in unlicensed spectrum (e.g., 5 GHz) to transmit PRS because of the other secondary cells operating in the unlicensed spectrum. To resolve this problem, either of two solutions, referred to herein as a "first solution" and a "second solution", to assist OTDOA using LAA cells may be used.

In the first solution, some or all secondary cell eNBs with the same coverage area or with overlapping coverage areas (e.g., secondary cell eNBs 110B-110D) are configured (e.g., by the location server 170 or by O&M) with the same PRS configuration and then transmit PRS having that configuration at different times based on when each secondary cell can win access to the shared medium (e.g., wireless communication medium 340). It is noted that secondary cell eNBs with overlapping coverage areas can include embodiments in which the coverage area of each secondary cell eNB overlaps at least partially with the coverage area of every other secondary cell eNB as well as embodiments in which the coverage area of each secondary cell eNB overlaps at least partially with the coverage area of at least one other secondary cell eNB. The UE 120 measures and reports the PRS transmitted during multiple positioning occasions for the same PRS configuration by obtaining a measurement (e.g., an RSTD measurement) for one positioning occasion at a time. In each positioning occasion, a different secondary cell may be transmitting PRS, depending on which secondary cell eNB wins access to the shared medium. Thus, in one example, UE 120 may measure an RSTD for each of three consecutive positioning occasions P1, P2 and P3 for the same PRS configuration. As an example, the three consecutive positioning occasions P1, P2 and P3 for the same PRS configuration may correspond to PRS positioning occasions (also referred to as PRS occasions or as positioning occasions) 1318a, 1318b and 1318c described later for FIG. 13. In positioning occasion P1, eNB 110B but not eNBs 110C and 110D may be transmitting, whereas in positioning occasions P2 and P3, eNBs 110C and 110D, respectively, may be transmitting (but not other eNBs). The three RSTD measurements thereby obtained by UE 120 would then correspond to RSTD measurements for each of eNBs 110B, 110C and 110D. Of course, many other permutations of PRS transmission in the shared medium would also be possible in practice, so the example above represents just one particular permutation. The UE 120 also records the time at which it measures each PRS positioning occasion. For example, UE 120 may use LTE timing (e.g., an LTE System Frame Number (SFN)) for an OTDOA reference cell (e.g., the macro cell eNB 110A) as a timing reference for each measurement time or may use an absolute time as a reference time such as GPS time. Thus, the UE 120 may measure and report (to the location server 170) a number of separate PRS positioning occasions that have the same PRS configuration (e.g., for each of the several different secondary cells) and may indicate the time of each PRS measurement (e.g., an SFN for the reference cell).

In this first solution, each secondary cell records the time at which it transmitted PRS and provides that information to the location server 170 so that the location server 170 knows which secondary cell(s) was (were) measured by the UE 120. As for the UE 120, each secondary cell (e.g., eNB 110B, 110C or 110D) may use LTE timing for a macro cell (e.g., eNB 110A) as a reference time or may use an absolute reference time (e.g., GPS time). In the case that secondary cells and UE 120 use the timing of a reference cell or macro cell for reporting measurement times (by UE 120) or PRS transmission times (by secondary cells) but with the reference cell used by UE 120 and the macro cells used by the secondary cells being different, location server 170 may use information provided by eNBs (e.g., eNBs 110A-110D) concerning their own LTE timing to enable location server 170 to determine the correspondence (e.g., difference) between the LTE timing for each eNB and thereby reconcile the different time references. In some cases, if PRS transmission from macro cells in a network is synchronized, such association by location server 170 of transmission timing for different cells may be unnecessary as the LTE timing for each macro cell may be the same as for every other macro cell. Upon determining which secondary cells were measured by the UE 120 based on the PRS measurements, the times of those measurements received from the UE 120 and the times at which the secondary cells transmitted PRS received from the secondary cells, the location server 170 can determine the location of the UE 120.

Figure 5:
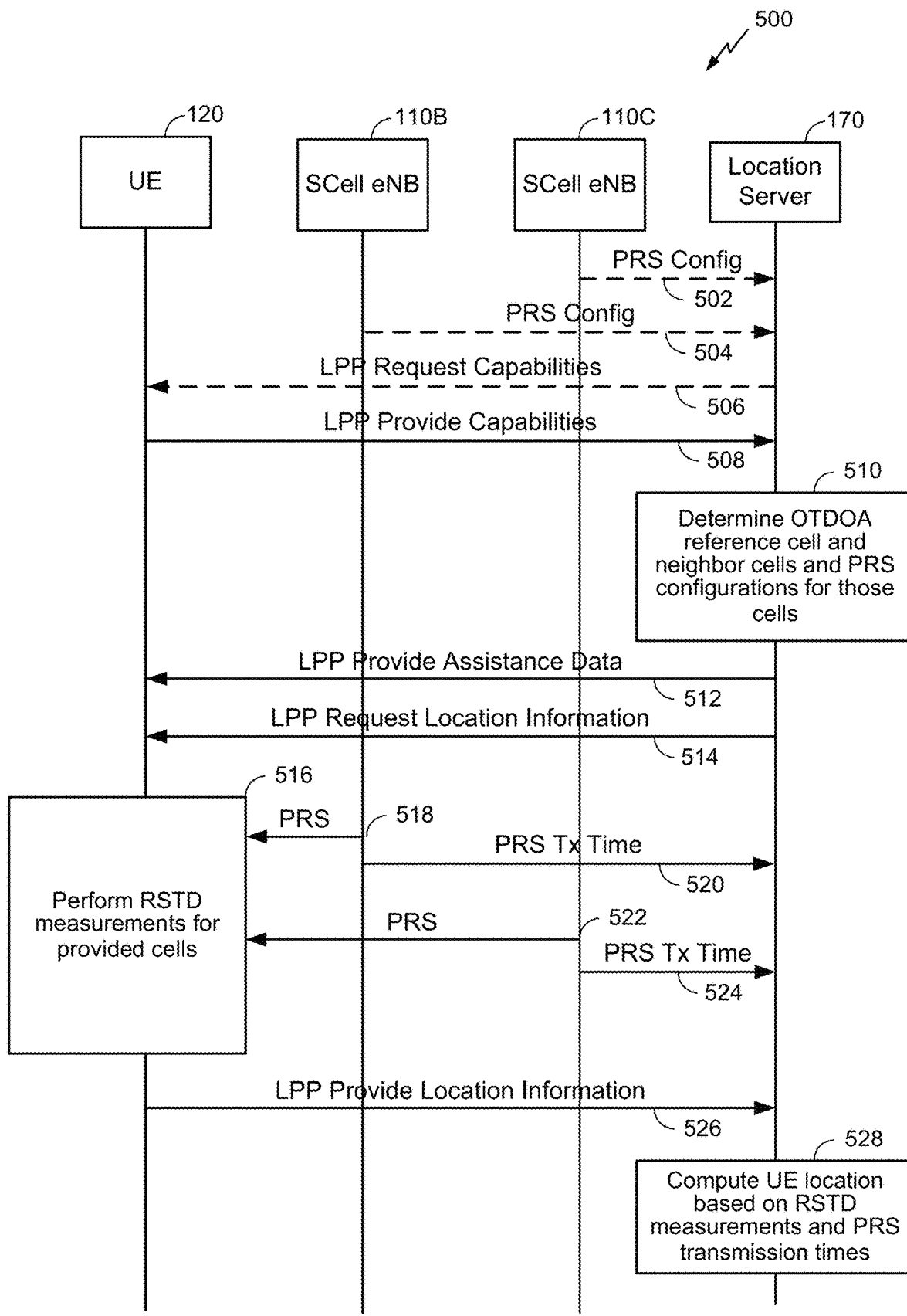
FIG. 5 shows an exemplary signaling flow illustrating an OTDOA positioning session utilizing LAA according to at least one aspect of the disclosure.

FIG. 5 shows an exemplary signaling flow 500 illustrating an OTDOA positioning method utilizing LAA according to the first solution described herein. As illustrated in FIG. 5, positioning of the UE 120 is supported via an exchange of LPP messages between the UE 120 and the location server 170 (e.g., an E-SMLC or a Secure User Plane Location (SUPL) Location Platform (SLP)). The LPP messages may be exchanged between UE 120 and the location server 170 via one or more intermediate networks, such as RAN 210 (e.g., via eNB 110A-110D) and core network 240 (e.g., via MME 215 with a control plane location solution when location server 170 comprises an E-SMLC or via P-GW 235 and SGW 230 with a user plane location solution when location server 170 comprises an SLP). When macro eNB 110A provides the primary serving cell for UE 120, LPP messages (e.g., as described here for FIG. 5 and later for FIG. 6) would typically be transferred between UE 120 and location server 170 via eNB 110A and MME 215 in the case that location server 170 is an E-SMLC. However, the LPP messages could be transferred via a secondary cell eNB (e.g., any of eNBs 110B-110D) in a downlink direction and possibly an uplink direction when location server 170 corresponds to a SUPL SLP since LPP messages would then be transferred within SUPL messages as data from the perspective of RAN 210. The procedure shown in FIG. 5 may be used to position the UE 120 in order to support various location-related services, such as navigation for UE 120 (or for the user of UE 120), or for routing, or for provision of an accurate location to a Public Safety Answering Point (PSAP) in association with an emergency call from UE 120 to a PSAP, or for some other reason.

Initially, and as optional operations of signaling flow 500, each secondary cell eNB 110 in a given geographic area (e.g., the coverage area of a macro cell eNB serving a UE 120 of interest, e.g., macro cell eNB 110A) may provide their PRS configuration to the location server 170 at stages 502 and 504. Provision of PRS configuration at stages 502 and 504 may be supported by sending an LTE Positioning Protocol A (LPPa) message from each of eNB 110B and eNB 110C to location server 170, with LPPa as defined in 3GPP TS 36.455. The PRS configuration information provided at stages 502 and 504 may include the periodicity of PRS positioning occasions, the number of consecutive LTE subframes in each PRS positioning occasion, PRS bandwidth, PRS carrier frequency, a PRS code sequence and other parameters as defined in 3GPP TS 36.355, and as described below for FIGS. 12 and 13. In the example of FIG. 5, for simplicity, only two secondary cell eNBs are shown, i.e., secondary cell eNB 110B and secondary cell eNB 110C. However, as will be appreciated, secondary cell eNB 110D may perform operations similar to the operations performed by secondary cell eNB 110B and secondary cell eNB 110C. Further, as will be appreciated, there may be more or fewer than the three secondary cell eNBs 110B-110D illustrated in FIG. 1 within the coverage area of macro cell eNB 110A.

At stage 506, the UE 120 may optionally receive a request for its positioning capabilities from the location server 170 (e.g., an LPP Request Capabilities message). At stage 508, the UE 120 provides its positioning capabilities to the location server 170 relative to the LPP protocol by sending an LPP Provide Capabilities message to location server 170 indicating the position methods and features of these position methods that are supported by the UE 120 using LPP. The capabilities indicated in the LPP Provide Capabilities message may, in some aspects, indicate that the UE 120 supports OTDOA positioning and may indicate the capabilities of the UE 120 to support OTDOA. The UE 120 can include PRS capability parameters describing supported PRS configurations for OTDOA in the LPP Provide Capabilities message. The UE 120 may further indicate a capability to support the first solution described herein (e.g., may indicate a capability to measure different positioning occasions for the same PRS configuration and report the measurements along with the time of each measurement as described previously herein for the first solution).

At stage 510, the location server 170 determines an OTDOA reference cell and neighbor cells and the PRS configuration for those cells, optionally based at least in part on the PRS capability parameters received at stage 508. The location server 170 may further determine the PRS configurations to be measured by the UE 120 for the reference cell and each neighbor cell based on the PRS capability parameters received from the UE and the PRS configurations received from the secondary cells. The location server 170 then sends an LPP Provide Assistance Data message to the UE 120 at stage 512. In some implementations, the LPP Provide Assistance Data message at stage 512 may be sent by the location server 170 to the UE 120 in response to an LPP Request Assistance Data message sent by the UE 120 to the location server 170 (not shown in FIG. 5).

The LPP Provide Assistance Data message may include positioning assistance data in the form of OTDOA assistance data to enable or to help enable the UE 120 to obtain and return OTDOA Reference Signal Time Difference (RSTD) measurements, and may include information for the reference cell identified at stage 510 (e.g., corresponding to macro cell eNB 110A). The information for the reference cell may include a global identity (ID) for the reference cell, a physical cell ID for the reference cell, a PRS ID, carrier frequency information, and PRS configuration parameters for the PRS configurations determined for the reference cell at stage 510 (e.g., PRS bandwidth, PRS carrier frequency, number of subframes per PRS positioning occasion, PRS code sequence, starting point and periodicity of PRS positioning occasions, and/or muting sequence).

The LPP Provide Assistance Data message may also include OTDOA assistance data for neighbor cells identified at stage 510 (e.g., corresponding to one or more of eNBs 110B-110D). The information provided for each neighbor cell in the LPP Provide Assistance Data message may be similar to that provided for the reference cell (e.g., may include a cell ID, PRS ID, carrier frequency, and PRS configuration parameters for the PRS configurations determined at stage 510) and may further include, for example, a slot number and/or subframe offset between the neighbor cell and the reference cell, and/or an expected approximate RSTD value and RSTD uncertainty. However, since in this example, the secondary cell eNBs 110B-110D are assumed to use the same PRS configuration, location server 170 may include information (e.g., PRS configuration parameters) once only in the LPP Provide Assistance Data message for this same PRS configuration and may not include the PRS configuration parameters for the same PRS configuration for each separate secondary cell eNB. Moreover, the configuration parameters for the same PRS configuration may include a physical cell ID or a PRS ID that identifies the PRS via a distinct PRS code sequence and that is used by each of the secondary cell eNBs 110B-110D which use the same PRS configuration. The location server 170 may additionally provide an expected RSTD value and an RSTD uncertainty for the same PRS configuration which include the range of expected RSTD values which UE 120 is expected to measure for each of the secondary cell eNBs 110B-110D. For example, the expected RSTD may be an expected average RSTD value and the RSTD uncertainty may allow for the different RSTDs which UE 120 is expected to measure for the different secondary cell eNBs 110B-110D. The location server 170 may further indicate in the LPP Provide Assistance Data message that UE 120 is expected to measure only individual PRS positioning occasions for the same PRS configuration and to provide the time of each measurement and may further indicate a preferred, a maximum and/or a minimum number of separate PRS positioning occasions for the same PRS configuration which UE 120 should attempt to measure. For example, a preferred number of separate PRS positioning occasions may equal the number of secondary cell eNBs 110 (e.g., two in this example) which use the same PRS configuration.

At stage 514, the location server 170 sends a request for location information to the UE 120. The request may be an LPP Request Location Information message. Note that in some implementations, the LPP Provide Assistance Data message sent at stage 512 may be sent after the LPP Request Location Information message at 514—e.g., if UE 120 sends a request for assistance data to location server 170 (e.g., in an LPP Request Assistance Data message, not shown in FIG. 5) after receiving the request for location information at stage 514. The request for location information sent at stage 514 may request the UE 120 to obtain RSTD measurements for OTDOA—e.g., in association with the information for the reference cell, neighbor cells and PRS configuration parameters sent to UE 120 at stage 512.

At stage 516, the UE 120 utilizes the OTDOA positioning assistance information received at stage 512 and any additional data (e.g., a desired location accuracy or a maximum response time) received at stage 514 to obtain RSTD measurements for the OTDOA position method. The RSTD measurements may be made between the reference cell indicated at stage 512, or a reference cell determined by the UE 120 from the neighbor cells indicated at stage 512, and one or more of the (other) neighbor cells indicated at stage 512. The UE 120 utilizes the PRS configuration parameters for the reference and neighbor cells provided at stage 512 to acquire and measure PRS signals for these cells, and according to the PRS configurations supported by UE 120, in order to obtain RSTD measurements.

During stage 516, the UE 120 measures PRS from secondary cell eNB 110B in a first PRS occasion (e.g., when the secondary cell eNB 110B can access the shared medium) at stage 518. The PRS received at stage 518 has a given configuration, indicated in the assistance data received at stage 512. Also during stage 516, but during a second PRS occasion (e.g., when the secondary cell eNB 110C can access the shared medium), the UE 120 measures PRS from secondary cell eNB 110C at stage 522. The PRS received at stage 522 has the same PRS configuration as the PRS received at stage 518, also indicated in the assistance data received at stage 512. The UE 120 records the times at which it measures the PRS at stages 518 and 522. Although FIG. 5 only illustrates the UE 120 measuring PRS during two PRS occasions, as will be appreciated, the UE 120 may measure PRS during more than two PRS occasions, so long as the PRS during each PRS occasion has the same PRS configuration.

After transmitting PRS at stages 518 and 522, the secondary cell eNBs 110B and 110C send the time at which they transmitted the respective PRS to the location server 170 at stages 520 and 524, respectively (e.g., using LPPa messages). In order to improve signaling efficiency, eNBs 110B and 110C may record and send their PRS transmission times at intervals of at least a few seconds or more, or may only send their PRS transmission times to location server 170 at stages 520 and 524 after receiving a request from location server 170 (not shown in FIG. 5), e.g., which may be sent using LPPa.

At stage 526, the UE 120 may send an LPP Provide Location Information message to the location server 170 conveying the RSTD measurements that were obtained at stage 516 and before or when any maximum response time has expired (e.g., a maximum response time provided by the location server 170 at stage 514). The LPP Provide Location Information message at stage 526 also includes the time at which each of the RSTD measurements was obtained.

At stage 528, the location server 170 computes an estimated location of the UE 120 using OTDOA positioning techniques based, at least in part, on the information received in the LPP Provide Location Information message at stage 526 (e.g., RSTD measurements and the time of each RSTD measurement). In an alternative aspect (not shown in FIG. 5), the location computation at stage 528 may be performed by the UE 120 after stage 516. For example, the positioning assistance data transferred in the message at stage 512 may include base station almanac (BSA) data for the reference cell(s) and neighbor cells (e.g., cell antenna location coordinates and timing or time synchronization information). In that case, the UE 120 may return any computed location estimate to the location server 170 in the message at stage 526 and stage 528 may not be performed.

FIG. 5 shows, and other figures reference, exemplary support for OTDOA positioning with LTE radio access by a UE (e.g., UE 120) and, in some cases, using the LTE positioning protocol (LPP). However, other examples exist where the support of PRS capability parameters and PRS configuration parameters by a UE 120 and location server 170 may be similar to or the same as that described for these figures but where the positioning protocol, the position method and/or the RAT may be different. For example, in alternative aspects, the positioning protocol may be the LPP Extensions (LPPe) protocol defined by OMA, a combination of LPP with LPPe (referred to as LPP/LPPe), the Resource Radio Control (RRC) protocol defined in 3GPP TS 36.331, the IS-801 protocol defined in 3GPP2 TS C.S0022, or an evolution of LPP for NR or 5G RAT access (e.g., which may be referred to as an NR Positioning Protocol (NPPa or NRPPa)). Similarly, the position method may be OTDOA for UMTS access, Enhanced Observed Time Difference (E-OTD) for GSM, Advanced Forward Link Trilateration (AFLT) or OTDOA for NR or 5G radio access. Further, the RAT may be UMTS (e.g., when the position method is OTDOA for UMTS) or may be NR or 5G (e.g., when the position method is OTDOA for NR or 5G). In addition, the downlink signal that is measured by a UE (e.g., UE 120) and broadcast by a base station (e.g., any of eNBs 110A-110D in the case of PRS) may not be a PRS signal but some other downlink reference signal or pilot signal (e.g., a cell-specific reference signal (CRS) for LTE or a tracking reference signal (TRS) for NR or 5G) and the measurements of the downlink signal may not be of RSTD but instead (or in addition) of some other characteristic such as Time of Arrival (TOA), Angle of Arrival (AOA), Received Signal Strength Indicator (RSSI), Round Trip Time (RTT) representing round trip signal propagation time, Signal-to-Noise (S/N) ratio, etc. Although the positioning protocol, the position method, the RAT, and/or the measured characteristics may differ, the provision of PRS (or other reference signal) capability parameters by the UE at stage 508 in signaling flow 500, the provision of PRS (or other reference signal) configuration parameters by the location server 170 at stage 512, and the transmission of a signal with the same configuration parameters (e.g., for PRS, TRS, CRS or some other signal) by secondary cell eNBs (or other secondary cell base stations) may be the same as or similar to that described previously.

In the second solution referred to previously, some or all secondary cells with the same coverage area or with overlapping coverage areas (e.g., secondary cell eNBs 110B-110D in communications systems 100 and 200) are provisioned (e.g., by location server 170 or by an O&M server) with the same set of PRS positioning occasions (e.g., a common PRS periodicity, a common number of subframes per PRS occasion, a common starting LTE subframe and/or possibly a common PRS bandwidth and/or common frequency hopping sequence) but with other PRS configuration parameters being different (e.g., a different physical cell ID, a different PRS ID, a different PRS code sequence, a different PRS frequency shift and/or a different muting pattern). As with the first solution, because a secondary cell must gain access to the shared medium before transmitting PRS, only one secondary cell transmits in each PRS occasion. The location server 170 (e.g., an E-SMLC) sends assistance data to the UE 120 that includes the various PRS configurations with which the nearby secondary cells have been configured. The PRS configuration for each secondary cell may thus indicate the same set of PRS occasions but may include other PRS configuration parameters which are different (e.g., distinct or unique for each secondary cell). Subsequently, when measuring any PRS occasion for any of the secondary cells, the UE 120 attempts to measure PRS for all possible PRS configurations with which it has been provisioned (for those secondary cells sharing the same PRS occasions). In that way, the UE 120 is likely to measure PRS from whichever secondary cell is transmitting during the PRS occasion. Attempting to simultaneously measure differently configured PRS transmissions may necessitate multiple signal correlations at the same time, which is generally only possible with certain UEs. For example, a UE 120 that supports the second solution may need to support multiple DL signal correlators (e.g., implemented in hardware or using software or firmware), where each signal correlator enables UE 120 to correlate an incoming signal with an expected PRS for one secondary cell eNB 110 according to the distinct or unique PRS configuration for this secondary cell eNB 110.

In order to determine which secondary cell is transmitting PRS in any positioning occasion, the UE 120 may determine an accuracy for a measurement of a PRS for each secondary cell eNB 110 (e.g., a measurement of a TOA or RSTD) and may determine that a particular secondary cell is transmitting a PRS only when an accuracy of the measurement of the PRS is above a certain threshold (e.g., such as being accurate to within 50-200 nanoseconds). Additionally, since UE 120 may report on the neighbor secondary cells to the serving primary or secondary cell regularly, the UE 120 may be aware of the secondary cells operating in the neighborhood.

Figure 6:
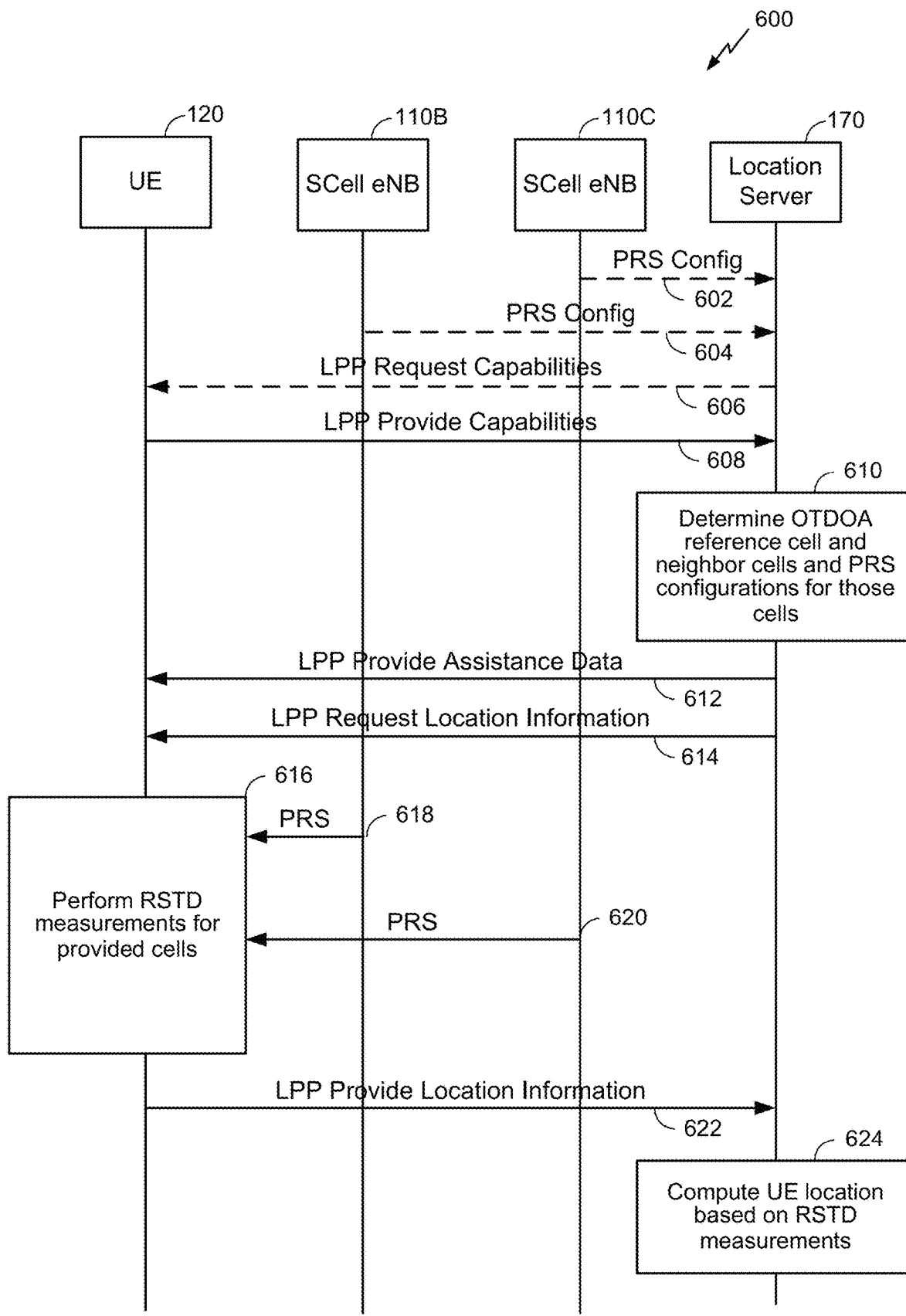
FIG. 6 shows an exemplary signaling flow illustrating an OTDOA positioning session utilizing LAA according to at least one aspect of the disclosure.

FIG. 6 shows an exemplary signaling flow 600 illustrating an OTDOA positioning session utilizing LPP according to the second solution described herein. As illustrated in FIG. 6, positioning of the UE 120 is supported via an exchange of LPP messages between the UE 120 and the location server 170 (e.g., an E-SMLC or an SLP). The LPP messages may be exchanged between UE 120 and the location server 170 via one or more intermediate networks, such as RAN 210 (e.g., via eNB 110A) and core network 240 (e.g., via MME 215 with a control plane location solution when location server 170 comprises an E-SMLC or via P-GW 235 and SGW 230 with a user plane location solution when location server 170 comprises an SLP). The procedure shown in FIG. 6 may be used to position the UE 120 in order to support various location-related services, such as navigation for UE 120 (or for the user of UE 120), or for routing, or for provision of an accurate location to a PSAP in association with an emergency call from UE 120 to a PSAP, or for some other reason.

Initially, and as optional operations of signaling flow 600, each secondary cell eNB 110 in a given geographic area (e.g., the coverage area of a macro cell eNB serving a UE 120 of interest, e.g., macro cell eNB 110A) may provide their PRS configuration (e.g., in an LPPa message) to the location server 170 at stages 602 and 604. In the example of FIG. 6, for simplicity, only two secondary cell eNBs are shown, i.e., secondary cell eNB 110B and secondary cell eNB 110C. However, as will be appreciated, secondary cell eNB 110D may perform operations similar to the operations performed by secondary cell eNB 110B and secondary cell eNB 110C. Further, as will be appreciated, there may be more or fewer than the three secondary cell eNBs 110B-110D illustrated in FIG. 1 within the coverage area of macro cell eNB 110A.

At stage 606, the UE 120 may optionally receive a request for its positioning capabilities from the location server 170 (e.g., an LPP Request Capabilities message). At stage 608, the UE 120 provides its positioning capabilities to the location server 170 relative to the LPP protocol by sending an LPP Provide Capabilities message to location server 170 indicating the position methods and features of these position methods that are supported by the UE 120 using LPP. The capabilities indicated in the LPP Provide Capabilities message may, in some aspects, indicate that the UE 120 supports OTDOA positioning and may indicate the capabilities of the UE 120 to support OTDOA. The UE 120 can include PRS capability parameters describing supported PRS configurations for OTDOA in the LPP Provide Capabilities message. The UE 120 may further indicate in the LPP Provide Capabilities message that UE 105 supports the second solution described herein (e.g., may indicate a capability to measure RSTDs for multiple secondary cells simultaneously in the same PRS occasion).

At stage 610, the location server 170 determines the OTDOA reference cell and neighbor cells and the PRS configuration for those cells based at least in part on the PRS capability parameters received at stage 608. The location server 170 may further determine the PRS configurations to be measured by the UE 120 for the reference cell and each neighbor cell based on the PRS capability parameters received from the UE and the PRS configurations received from the secondary cells. The location server 170 then sends an LPP Provide Assistance Data message to the UE 120 at stage 612. In some implementations, the LPP Provide Assistance Data message at stage 612 may be sent by the location server 170 to the UE 120 in response to an LPP Request Assistance Data message sent by the UE 120 to the location server 170 (not shown in FIG. 6).

The LPP Provide Assistance Data message may include positioning assistance data in the form of OTDOA assistance data to enable or to help enable the UE 120 to obtain and return OTDOA RSTD measurements, and may include information for the reference cell identified at stage 610 (e.g., corresponding to eNB 110A). The information for the reference cell may include a global ID for the reference cell, a physical cell ID for the reference cell, a PRS ID, carrier frequency information, and PRS configuration parameters for the PRS configurations determined for the reference cell at stage 610 (e.g., PRS bandwidth, PRS carrier frequency, number of subframes per PRS positioning occasion, PRS code sequence, starting point and periodicity of PRS positioning occasions, and/or muting sequence).

The LPP Provide Assistance Data message may also include OTDOA assistance data for neighbor cells identified at stage 610 (e.g., corresponding to one or more of eNBs 110B-110D). The information provided for each neighbor cell in the LPP Provide Assistance Data message may be similar to that provided for the reference cell (e.g., may include a cell ID, PRS ID, carrier frequency, and PRS configuration parameters for the PRS configurations determined at stage 610) and may further include, for example, a slot number and/or subframe offset between the neighbor cell and the reference cell, and/or an expected approximate RSTD value and RSTD uncertainty. Since in this example, the secondary cell eNBs 110B-110D are assumed to use the same PRS occasions but to use certain other PRS configuration parameters which are different, location server 170 may include information (e.g., PRS configuration parameters) once only in the LPP Provide Assistance Data message for the common PRS occasions (e.g., a periodicity, number of subframes per PRS occasion, starting subframe number and possibly PRS bandwidth and carrier frequency), but may include other PRS configuration parameters (e.g., PRS ID, PRS code sequence, PRS frequency shift, PRS muting pattern) separately for each secondary cell eNB. In one embodiment, location server 170 may include the complete PRS configuration for each secondary cell eNB separately (e.g., the same as if solution 2 is not used). The location server 170 may additionally provide a separate expected RSTD value and a separate RSTD uncertainty for each secondary cell eNB. The location server 170 may further indicate in the LPP Provide Assistance Data message that UE 120 is expected to support the second solution with respect to an indicated set of secondary cell eNBs with the same or overlapping coverage (e.g., eNBs 110B and 110C in the example in FIG. 6) and thus to attempt to measure an RSTD for each of these secondary cell eNBs simultaneously in each of the common PRS occasions. The location server 170 may further indicate a preferred, a maximum and/or a minimum number of separate PRS positioning occasions for the secondary cell eNBs which UE 120 should attempt to measure. For example, a preferred number of separate PRS positioning occasions may equal the number of secondary cell eNBs 110 (e.g., two in this example).

At stage 614, the location server 170 sends a request for location information to the UE 120. The request may be an LPP Request Location Information message. Note that in some implementations, the LPP Provide Assistance Data message sent at stage 612 may be sent after the LPP Request Location Information message at 614—e.g., if UE 120 sends a request for assistance data to location server 170 (e.g., in an LPP Request Assistance Data message, not shown in FIG. 6) after receiving the request for location information at stage 614. The request for location information sent at stage 614 may request the UE 120 to obtain RSTD measurements for OTDOA—e.g., in association with the information for the reference cell, neighbor cells and PRS configuration parameters sent to UE 120 at stage 612.

At stage 616, the UE 120 utilizes the OTDOA positioning assistance information received at stage 612 and any additional data (e.g., a desired location accuracy or a maximum response time) received at stage 614 to perform RSTD measurements for the OTDOA position method. The RSTD measurements may be made between the reference cell indicated at stage 612, or a reference cell determined by the UE 120 from the neighbor cells indicated at stage 612, and one or more of the (other) neighbor cells indicated at stage 612. The UE 120 utilizes the PRS configuration parameters for the reference and neighbor cells provided at stage 612 to acquire and measure PRS signals for these cells, and according to the PRS configurations supported by UE 120, in order to obtain RSTD measurements.

During stage 616, the UE 120 attempts to measures a PRS from both secondary cell eNB 110B and secondary cell eNB 110C (and possibly other secondary cell eNBs not shown in FIG. 6 such as secondary cell eNB 110D) at the same time and for the same PRS occasions as described previously for the second solution. However, since only one secondary cell eNB will typically win access to each PRS occasion, UE 120 will typically only measure an RSTD for one secondary cell eNB during each PRS occasion, though UE 120 may not know which secondary cell eNB will be measured until after the measurement has been obtained. UE 120 may determine which secondary cell eNB 110 (or which PRS configuration) has been measured for each PRS occasion based on detecting one or more PRS configuration parameters during the measurement which are distinct or unique for a particular secondary eNB 110 (or a particular PRS configuration), such as a PRS code sequence or PRS frequency shift. In addition or alternatively, UE 120 may determine an accuracy of a measurement (e.g., a TOA or RSTD measurement) for each PRS configuration which could be transmitted by a secondary cell eNB 110 and may assume that a PRS for a particular PRS configuration and associated secondary cell eNB 110 was transmitted only if the accuracy of the measurement exceeds some threshold (e.g., such as threshold equal to 50-200 nanoseconds).

In the example shown in FIG. 6, secondary cell eNB 110B transmits a PRS in a first PRS occasion (e.g., when the secondary cell eNB 110B can access the shared medium) at stage 618. The PRS received at stage 618 has a given PRS configuration, indicated in the assistance data received at stage 612. Following stage 618 and still during stage 616, and during a second PRS occasion (e.g., when the secondary cell eNB 110C can access the shared medium), the UE 120 measures PRS from secondary cell eNB 110C at stage 620. The PRS received at stage 620 has a different PRS configuration from the configuration of the PRS received at stage 618, also indicated in the assistance data received at stage 612. Although FIG. 6 only illustrates the UE 120 measuring PRS during two PRS occasions, as will be appreciated, the UE 120 may measure PRS during more than two PRS occasions, and each PRS may have a different PRS configuration.

At stage 622, the UE 120 may send an LPP Provide Location Information message to the location server 170 conveying the RSTD measurements that were obtained at stage 616 before or when any maximum response time has expired (e.g., a maximum response time provided by the location server 170 at stage 614). Since the UE 120 can identify the distinct PRS configurations measured during stage 616, UE 620 can indicate the secondary cell eNB and/or the PRS configuration (e.g., using a physical cell ID and/or PRS ID) whose PRS transmission was measured for each RSTD measurement conveyed at stage 622.

At stage 624, the location server 170 computes an estimated location of the UE 120 using OTDOA positioning techniques based, at least in part, on the information received in the LPP Provide Location Information message at stage 622 (e.g., RSTD measurements and secondary cell eNB and/or PRS configuration identifications). In an alternative aspect (not shown in FIG. 6), the location computation at stage 624 may be performed by the UE 120 after stage 616. For example, the positioning assistance data transferred in the message at stage 612 may include BSA data for the reference cell(s) and neighbor cells (e.g., cell antenna location coordinates and timing or time synchronization information). In that case, the UE 120 may return any computed location estimate to the location server 170 in the message at stage 622 and stage 624 may not be performed.

Figure 7:
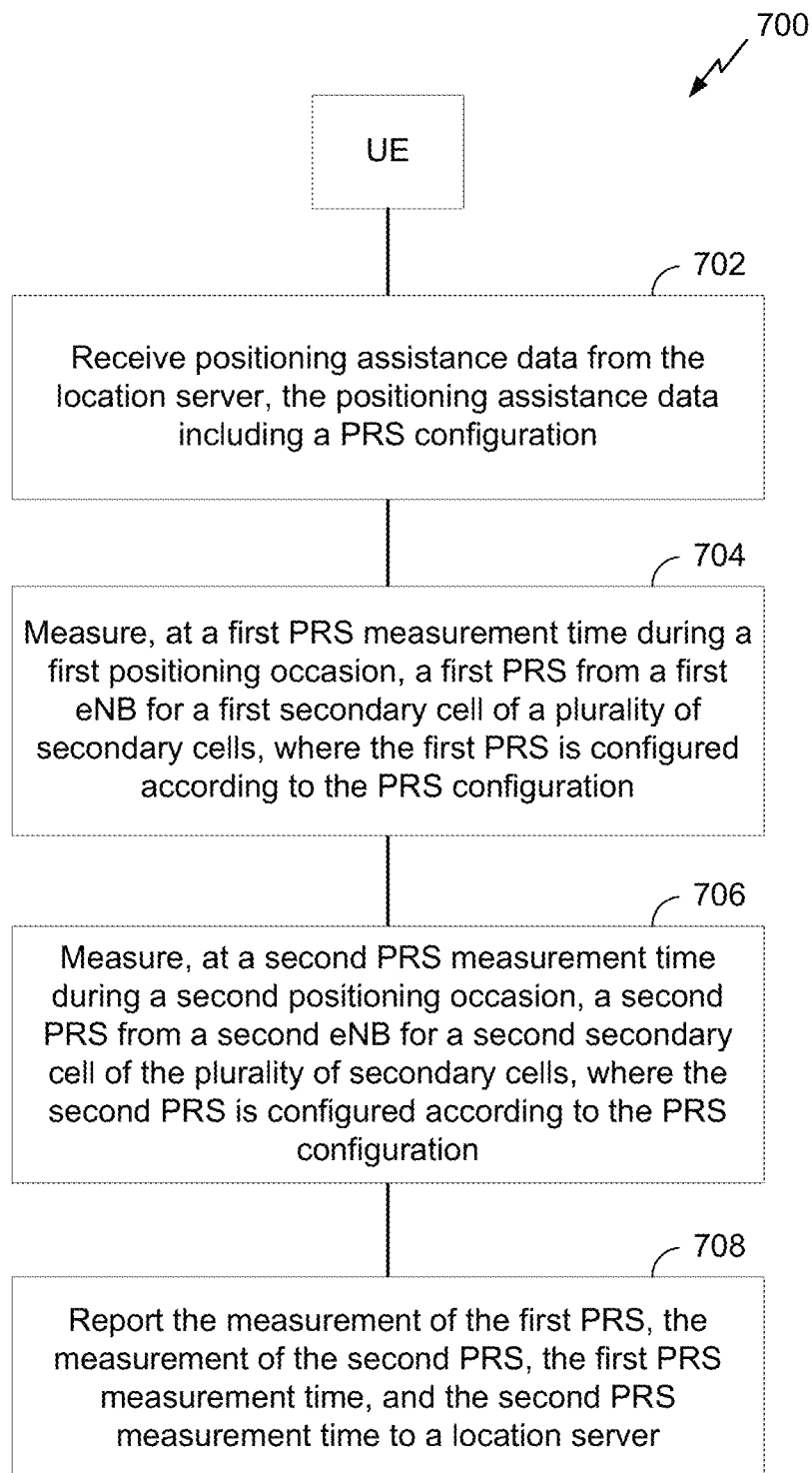
FIGS. 7-11 illustrate exemplary methods for determining, or assisting in the determination of, a position of a UE communicating over a shared communication medium in unlicensed spectrum.

FIG. 7 illustrates an exemplary method 700 for assisting position determination of a UE communicating over a shared communication medium in unlicensed spectrum (e.g., wireless communication medium 340). The method 700 may be performed by a UE (e.g., the UE 120) that is in communication with (e.g., supporting a location session with) a location server (e.g., the location server 170).

At 702, the UE (e.g., communication device 312 and/or the processing system 316 in conjunction with the positioning module 324) receives positioning assistance data from the location server, as at stage 512 in FIG. 5, where the positioning assistance data includes a PRS configuration.

For example, the PRS configuration may be a common PRS configuration for two or more secondary cell eNBs (e.g., eNBs 110B-110D) with the same coverage area or with overlapping coverage areas. In an aspect, the positioning assistance data may indicate that a first eNB and a second eNB transmit PRS (e.g., according to the PRS configuration) using different positioning occasions. Means for performing the functionality of block 702 may, but not necessarily, include, for example, communication device 312 (such as one or both of licensed RAT transceiver 320 or unlicensed RAT transceiver 322), communication controller 314, positioning module 324, processing system 316, and/or memory component 318.

At 704, the UE (e.g., communication device 312 and/or the processing system 316 in conjunction with the positioning module 324) measures, at a first PRS measurement time during a first positioning occasion, a first PRS from the first eNB for a first secondary cell (e.g., secondary cell eNB 110B) of a plurality of secondary cells (e.g., secondary cell eNBs 110B-110D), as at stage 516. The first eNB transmits the first PRS on the shared communication medium, as at stage 518, and the first PRS is configured according to the PRS configuration. In an aspect, the first eNB transmits the first PRS on the shared communication medium upon winning access to the shared communication medium. The first eNB may report to the location server a first PRS transmission time at which the first eNB transmitted the first PRS, as at stage 520.

At 706, the UE (e.g., communication device 312 and/or the processing system 316 in conjunction with the positioning module 324) measures, at a second PRS measurement time during a second positioning occasion, a second PRS from the second eNB for a second secondary cell (e.g., secondary cell eNB 110C) of the plurality of secondary cells, as at stage 516. The second eNB transmits the second PRS on the shared communication medium, as at stage 522, and the second PRS is configured according to the PRS configuration. In an aspect, the second eNB transmits the second PRS on the shared communication medium upon winning access to the shared communication medium. The second eNB may report to the location server a second PRS transmission time at which the second eNB transmitted the second PRS, as at stage 524. Means for performing the functionality of blocks 704 and 706 may, but not necessarily, include, for example, communication device 312 (such as unlicensed RAT transceiver 322), communication controller 314, positioning module 324, processing system 316, and/or memory component 318.

At 708, the UE (e.g., communication device 312 and/or the processing system 316 in conjunction with the positioning module 324) reports the measurement of the first PRS, the measurement of the second PRS, the first PRS measurement time, and the second PRS measurement time to the location server, as at stage 526. In an aspect, the measurement of the first PRS and the measurement of the second PRS are measurements of an RSTD for OTDOA positioning for LTE wireless access. Means for performing the functionality of block 708, may, but not necessarily, include, for example, communication device 312 (such as, one or both of licensed RAT transceiver 320 or unlicensed RAT transceiver 322), communication controller 314, positioning module 324, processing system 316, and/or memory component 318.

Although not illustrated in FIG. 7, optionally, the UE (e.g., communication device 312 and/or the processing system 316 in conjunction with the positioning module 324) may further measure, at a third PRS measurement time during a third positioning occasion, a third PRS from a third eNB for a third secondary cell of the plurality of secondary cells. Similar to first and second eNBs above, the third eNB transmits the third PRS on the shared communication medium and the third PRS is configured according to the PRS configuration. In an aspect, the third eNB transmits the third PRS on the shared communication medium upon winning access to the shared communication medium. The third eNB may report to the location server a third PRS transmission time at which the third eNB transmitted the third PRS.

In an aspect, the location server determines that the UE measured the first PRS from the first eNB and the second PRS from the second eNB based on the first PRS measurement time and the second PRS measurement time reported by the UE and the first PRS transmission time and the second PRS transmission time reported by the first and second eNBs. The location server can then determine the position of the UE based at least in part on the measurement of the first PRS and the measurement of the second PRS and a location of the first eNB and a location of the second eNB.

In an aspect, the first eNB and the second eNB may be the same eNB and the first secondary cell and the second secondary cell may be different cells, or sectors, of the same eNB. Alternatively, they may be different eNBs.

Figure 8:
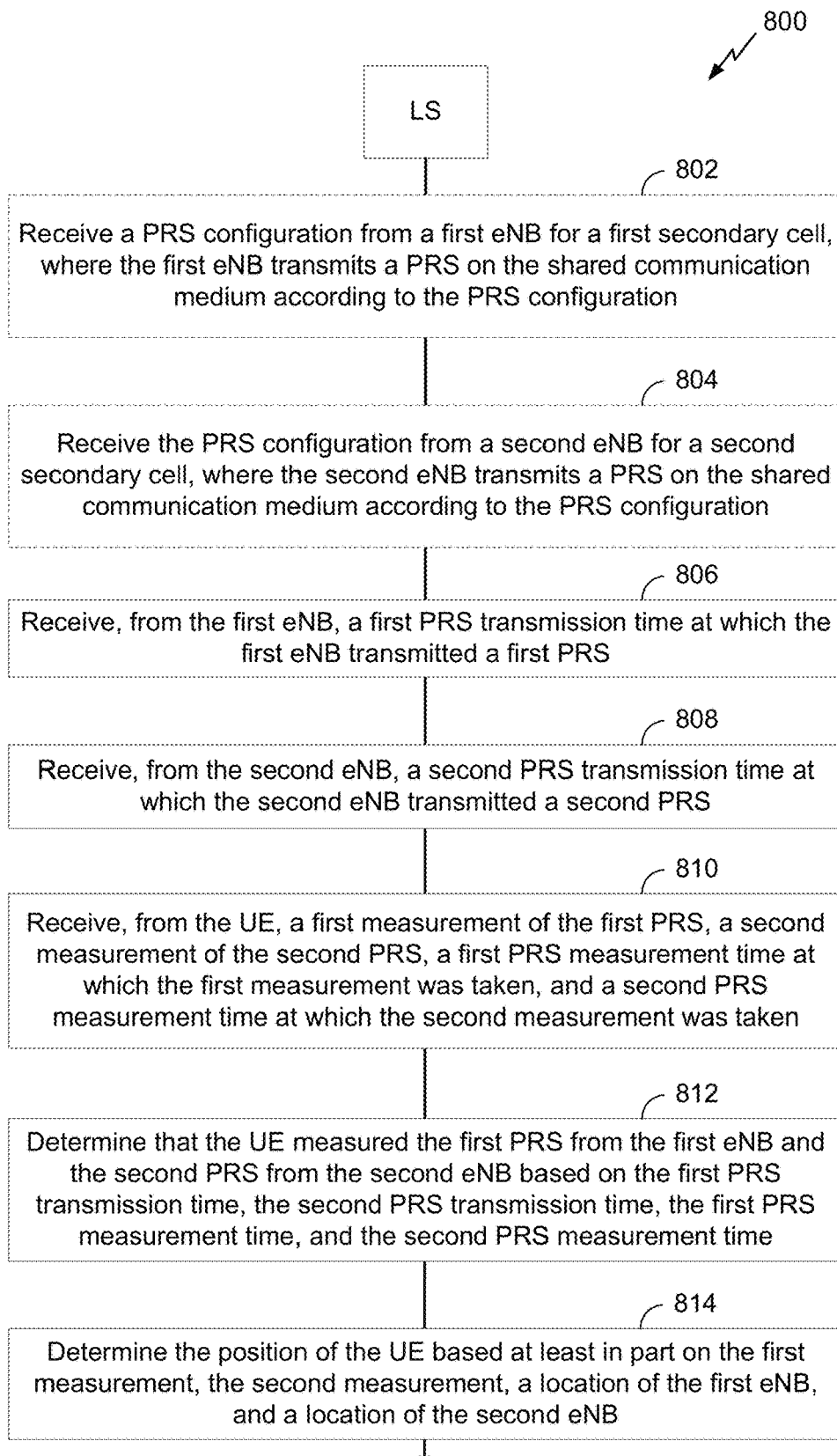

FIG. 8 illustrates an exemplary method 800 for determining a position of a UE (e.g., the UE 120) communicating over a shared communication medium in unlicensed spectrum (e.g., wireless communication medium 340). Method 800 may be performed by a location server (LS) (e.g., the location server 170).

At 802, which is an optional block, the location server (e.g., communication device 404 and/or the processing system 401 in conjunction with the positioning module 424) receives a PRS configuration from a first eNB for a first secondary cell (e.g., secondary cell eNB 110B) of a plurality of secondary cells (e.g., secondary cell eNBs 110B-110D), as at stage 504. The first eNB transmits a first PRS on the shared communication medium according to the PRS configuration, as at stage 518. In an aspect, the first eNB transmits the first PRS on the shared communication medium upon winning access to the shared communication medium.

At 804, which is an optional block, the location server (e.g., communication device 404 and/or the processing system 401 in conjunction with the positioning module 424) receives the PRS configuration from a second eNB for a second secondary cell (e.g., secondary cell eNB 110C) of the plurality of secondary cells, as at stage 502. The second eNB transmits a second PRS on the shared communication medium according to the PRS configuration, as at stage 522. In an aspect, the second eNB transmits the second PRS on the shared communication medium upon winning access to the shared communication medium. In an aspect, blocks 802 and 804 do not occur and the location server instead receives the information for the PRS configuration and the first and second eNBs (as described for blocks 802 and 804) from another source such as an O&M server.

At 806, the location server (e.g., communication device 404 and/or the processing system 401 in conjunction with the positioning module 424) receives, from the first eNB, a first PRS transmission time at which the first eNB transmitted a first PRS, as at stage 520.

At 808, the location server (e.g., communication device 404 and/or the processing system 401 in conjunction with the positioning module 424) receives, from the second eNB, a second PRS transmission time at which the second eNB transmitted a second PRS, as at stage 524. Means for performing the functionality of blocks 802-808 may, but not necessarily, include, for example, communication device 404, positioning module 424, processing system 401, volatile memory 402, and/or nonvolatile memory 403.

At 810, the location server (e.g., communication device 404 and/or the processing system 401 in conjunction with the positioning module 424) receives, from the UE, a first measurement of the first PRS, a second measurement of the second PRS, a first PRS measurement time at which the first measurement was taken, and a second PRS measurement time at which the second measurement was taken, as at stage 526. In an aspect, the measurement of the first PRS and the measurement of the second PRS are measurements of an RSTD for OTDOA positioning for LTE wireless access. Means for performing the functionality of block 810 may, but not necessarily, include, for example, communication device 404, positioning module 424, processing system 401, volatile memory 402, and/or nonvolatile memory 403.

At 812, the location server (e.g., the processing system 401 in conjunction with the positioning module 424) determines that the UE measured the first PRS from the first eNB and the second PRS from the second eNB based on the first PRS measurement time, the second PRS measurement time, the first PRS transmission time, and the second PRS transmission time.

At 814, the location server (e.g., the processing system 401 in conjunction with the positioning module 424) determines the position of the UE based at least in part on the first measurement, the second measurement, a location of the first eNB, and a location of the second eNB, as at stage 528. Means for performing the functionality of blocks 812 and 814 may, but not necessarily, include, for example, positioning module 424, processing system 401, volatile memory 402, and/or nonvolatile memory 403.

Although not illustrated in FIG. 8, the method 800 may further include sending, by the location server, positioning assistance data to the UE, as at stage 512, where the positioning assistance data includes the PRS configuration. In that case, the positioning assistance data may indicate that the first eNB and the second eNB transmit PRS using different positioning occasions.

Although not illustrated in FIG. 8, the method 800 may further include receiving, at the location server from a third eNB for a third secondary cell of the plurality of secondary cells, a third PRS transmission time at which the third eNB transmitted a third PRS, and receiving, at the location server from the UE, a third measurement of the third PRS and a third PRS measurement time at which the third measurement was taken. Here, the third eNB transmits the third PRS on the shared communication medium according to the PRS configuration, and the location server may, in some aspects, receive the PRS configuration from the third eNB. The method 800 may further include determining, by the location server, that the UE measured the third PRS from the third eNB based on the third PRS transmission time and the third PRS measurement time, and determining, by the location server, the position of the UE based at least in part on the third measurement and a location of the third eNB.

In an aspect, the first eNB, the second eNB, and the third eNB, or some combination thereof, may be the same eNB, and the first secondary cell, the second secondary cell, and the third secondary cell, or some combination thereof, may be different cells, or sectors, of the same eNB. Alternatively, they may be different eNBs.

Figure 9:
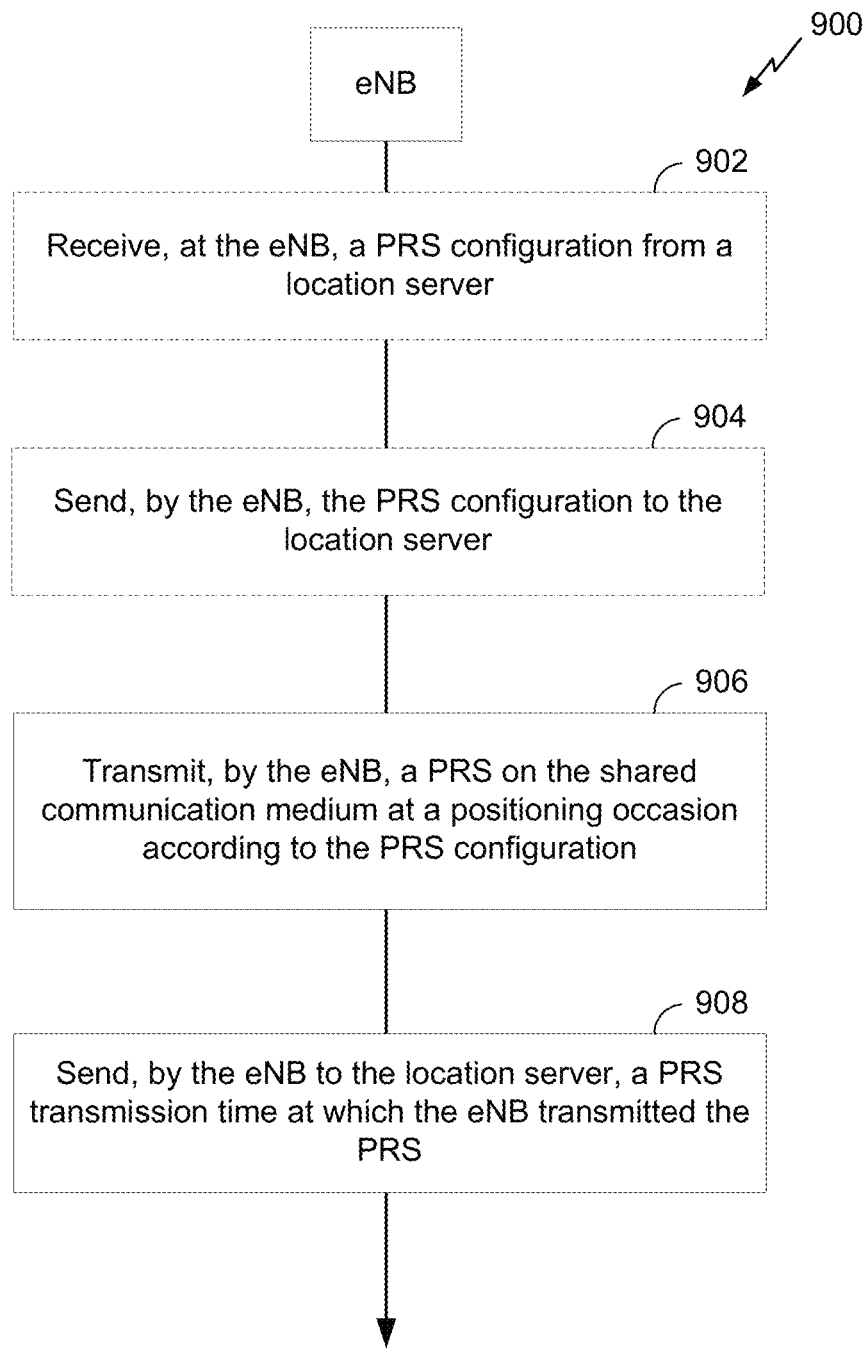

FIG. 9 illustrates an exemplary method 900 for assisting a position determination of a UE (e.g., the UE 120) communicating over a shared communication medium in unlicensed spectrum (e.g., wireless communication medium 340). The method 900 may be performed by an eNB for a secondary cell that uses the shared communication medium (e.g., any of eNBs 110B-110D).

At 902, which is an optional block, the eNB (e.g., communication device 362 and/or the processing system 366 in conjunction with the communication controller 364) for the secondary cell receives a PRS configuration from a location server (e.g., location server 170). At 904, which is also an optional block, the eNB sends the PRS configuration to the location server. Blocks 902 and 904 may be mutually exclusive and may not always occur. When block 902 does not occur, the eNB may receive the PRS configuration from another source such as an O&M server.

At 906, the eNB (e.g., communication device 362 and/or the processing system 366 in conjunction with the communication controller 364) transmits a PRS on the shared communication medium at a positioning occasion according to the PRS configuration, as at stage 518 or 522. In an aspect, the eNB transmits the PRS on the shared communication medium upon winning access to the shared communication medium. In an aspect, the eNB performs a listen before talk procedure to win access to the shared communication medium before transmitting the PRS.

At 908, the eNB (e.g., communication device 362 and/or the processing system 366 in conjunction with the communication controller 364) sends, to the location server, a PRS transmission time at which the eNB transmitted the PRS, as at stage 520 or 524. Means for performing the functionality of blocks 902-908 may, but not necessarily, include, for example, communication device 362, communication controller 364, processing system 366, and/or memory component 368.

Although not illustrated in FIG. 9, the method 900 may further include recording, by the eNB, the PRS transmission time at which the eNB transmitted the PRS. The method 900 may also further include receiving a request from the location server for the PRS transmission time at which the eNB transmitted the PRS and sending the PRS transmission time to the location server at block 908 in response to the request.

Figure 10:
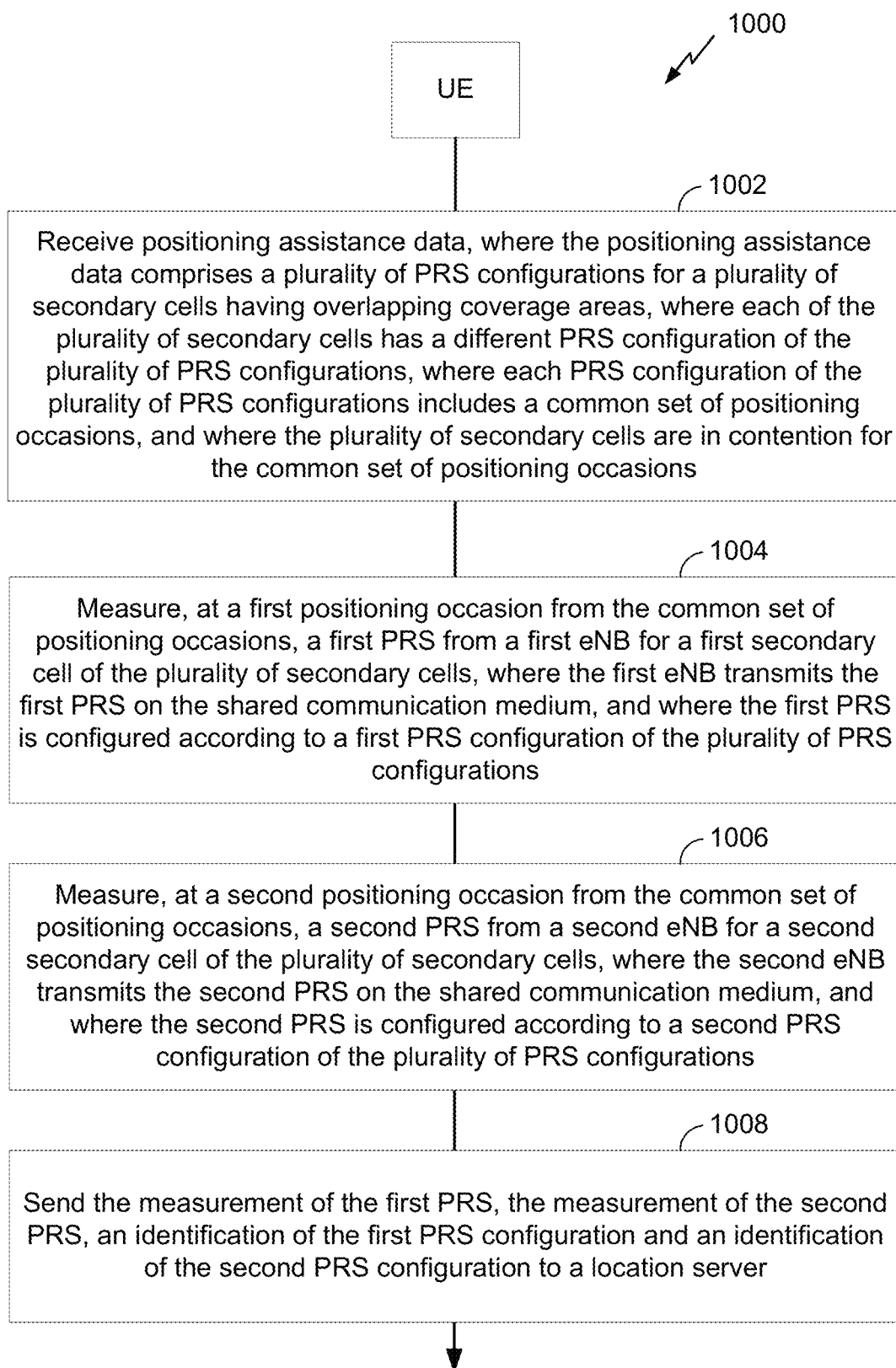

FIG. 10 illustrates an exemplary method 1000 for assisting a position determination of a UE communicating over a shared communication medium in unlicensed spectrum (e.g., wireless communication medium 340). The method 1000 may be performed by a UE (e.g., the UE 120).

At 1002, the UE (e.g., communication device 312 and/or the communication controller 314 and/or the processing system 316 in conjunction with the positioning module 324) receives positioning assistance data (e.g., from a location server such as location server 170, as at stage 612). In an aspect, the positioning assistance data includes a plurality of PRS configurations for a plurality of secondary cells (e.g., secondary cells for eNBs 110B-110D) having overlapping coverage areas, where each of the plurality of secondary cells has a different PRS configuration of the plurality of PRS configurations. In addition, each PRS configuration of the plurality of PRS configurations includes a common set of positioning occasions, where the plurality of secondary cells are in contention for the common set of positioning occasions (e.g., such that a PRS is transmitted for only one secondary cell in each positioning occasion).

At 1004, the UE (e.g., communication device 312 and/or the communication controller 314 and/or the processing system 316 in conjunction with the positioning module 324) measures, at a first positioning occasion from the common set of positioning occasions, a first PRS from a first eNB for a first secondary cell (e.g., secondary cell eNB 110B) of the plurality of secondary cells, as at stages 616 and 618. In an aspect, the first eNB transmits the first PRS on the shared communication medium, and the first PRS is configured according to a first PRS configuration of the plurality of PRS configurations. In an aspect, the first eNB transmits the first PRS on the shared communication medium upon winning access to the shared communication medium.

At 1006, the UE (e.g., communication device 312 and/or the communication controller 314 and/or the processing system 316 in conjunction with the positioning module 324) measures, at a second positioning occasion from the common set of positioning occasions, a second PRS from a second eNB for a second secondary cell (e.g., secondary cell eNB 110C) of the plurality of secondary cells, as at stages 616 and 620. The UE measures PRS—whether a first PRS, second PRS, or other PRS—based on the positioning assistance data comprising the plurality of PRS configurations, that is, the reception of the PRS configuration described with reference to block 1002 above, as the positioning assistance data includes data relating to the first and second positioning occasions. The second eNB transmits the second PRS on the shared communication medium, and the second PRS is configured according to a second PRS configuration of the plurality of PRS configurations. In an aspect, only one eNB for the plurality of secondary cells transmits a PRS during a given positioning occasion. In an aspect, the second eNB transmits the second PRS on the shared communication medium upon winning access to the shared communication medium.

At 1008, the UE (e.g., communication device 312 and/or the communication controller 314 and/or the processing system 316 in conjunction with the positioning module 324) sends the measurement of the first PRS, the measurement of the second PRS, an identification of the first PRS configuration and an identification of the second PRS configuration to a location server (e.g., location server 170, as at stage 622). In an aspect, the location server determines the position of the UE based at least in part on the measurement of the first PRS, the measurement of the second PRS, the identification of the first PRS configuration, the identification of the second PRS configuration, a location of the first eNB, and a location of the second eNB (e.g., as at stage 624). In an aspect, the UE sends the measurement of the first PRS and the measurement of the second PRS to the location server based on an accuracy of the measurement of the first PRS and an accuracy of the measurement of the second PRS being above a threshold (e.g., as described previously for the second solution). In an aspect, the measurement of the first PRS and the measurement of the second PRS are measurements of an RSTD for OTDOA positioning for a LTE wireless access. Means for performing the functionality of blocks 1002-1008 may, but not necessarily, include, for example, communication device 312, communication controller 314, positioning module 324, processing system 316, and/or memory component 318.

Although not illustrated, the method 1000 may further include measuring, by the UE at a third positioning occasion of the common set of positioning occasions, a third PRS from a third eNB for a third secondary cell of the plurality of secondary cells, wherein the third eNB transmits the third PRS on the shared communication medium, and wherein the third PRS is configured according to a third PRS configuration of the plurality of PRS configurations. The method 1000 may further include reporting, by the UE, the measurement of the third PRS to the location server.

In an aspect, the first eNB, the second eNB, and the third eNB, or some combination thereof, may be the same eNB, and the first secondary cell, the second secondary cell, and the third secondary cell, or some combination thereof, may be different cells, or sectors, of the same eNB. Alternatively, they may be different eNBs.

Figure 11:
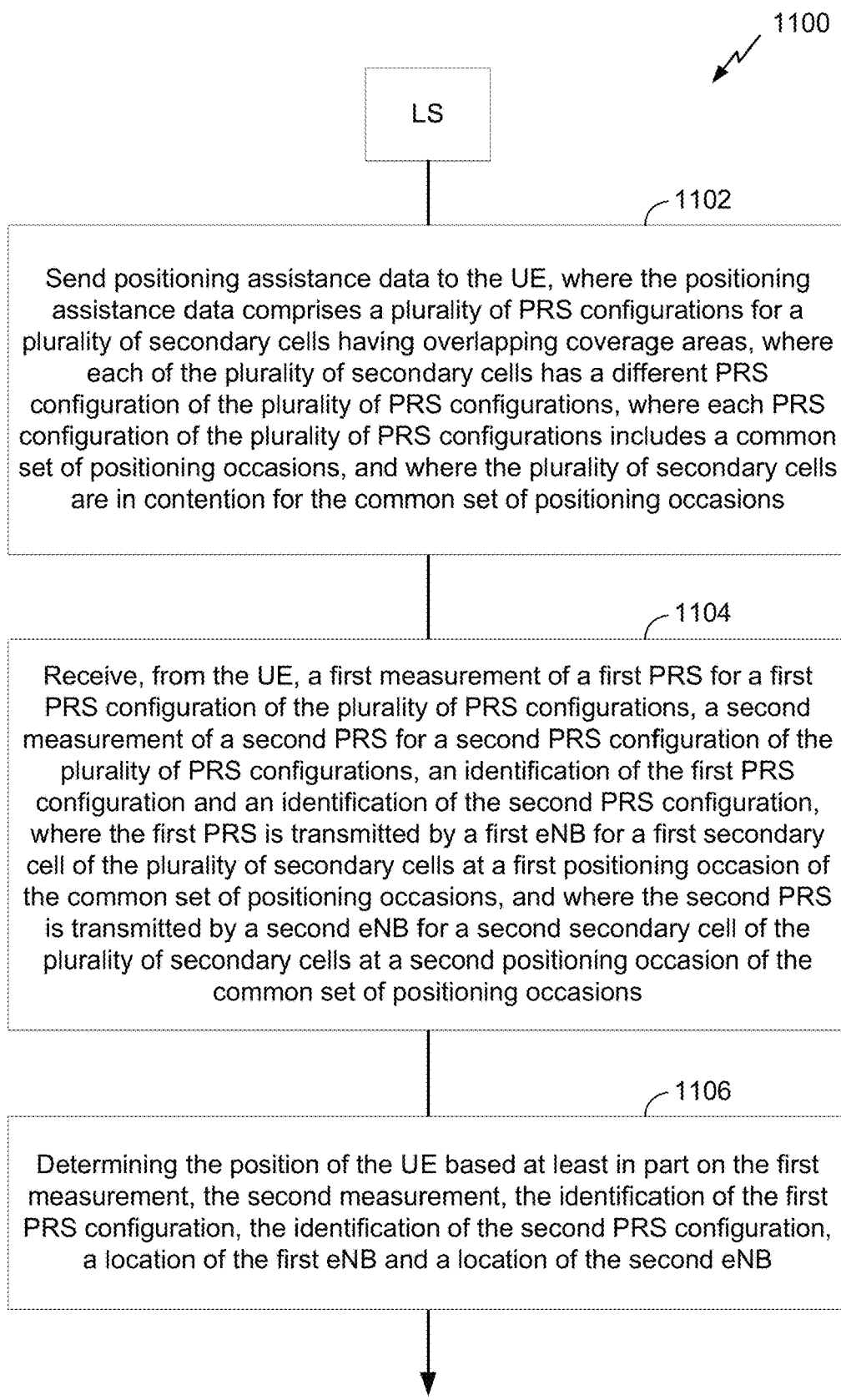

FIG. 11 illustrates an exemplary method 1100 for determining a position of a UE (e.g., the UE 120) communicating over a shared communication medium in unlicensed spectrum (e.g., wireless communication medium 340). Method 1100 may be performed by a location server such as the location server 170.

At 1102, the location server (e.g., communication device 404 and/or the processing system 401 in conjunction with the positioning module 424) sends positioning assistance data to the UE, as at stage 612. In an aspect, the positioning assistance data includes a plurality of PRS configurations for a plurality of secondary cells (e.g., secondary cells for eNBs 110B-110D) having overlapping coverage areas, where each of the plurality of secondary cells has a different PRS configuration of the plurality of PRS configurations. In an aspect, each PRS configuration of the plurality of PRS configurations includes a common set of positioning occasions. In an aspect, the plurality of secondary cells are in contention for the common set of positioning occasions.

At 1104, the location server (e.g., communication device 404 and/or the processing system 401 in conjunction with the positioning module 424) receives, from the UE, a first measurement of a first PRS for a first PRS configuration of the plurality of PRS configurations, a second measurement of a second PRS for a second PRS configuration of the plurality of PRS configurations, an identification of the first PRS configuration and an identification of the second PRS configuration, as at stage 622. In an aspect, the first PRS is transmitted by a first eNB (e.g., eNB 110B) for a first secondary cell of the plurality of secondary cells at a first positioning occasion of the common set of positioning occasions, and the second PRS is transmitted by a second eNB (e.g., eNB 110C) for a second secondary cell of the plurality of secondary cells at a second positioning occasion of the common set of positioning occasions. In an aspect, the UE sends the measurement of the first PRS and the measurement of the second PRS to the location server based on an accuracy of the measurement of the first PRS and an accuracy of the measurement of the second PRS being above a threshold. In an aspect, the measurement of the first PRS and the measurement of the second PRS are measurements of an RSTD for OTDOA positioning for a LTE wireless access. In an aspect, an eNB for only one of the plurality of secondary cells transmits a PRS during a given positioning occasion of the common set of positioning occasions. In an aspect, the first eNB transmits the first PRS on the shared communication medium upon winning access to the shared communication medium, and the second eNB transmits the second PRS on the shared communication medium upon winning access to the shared communication medium.

At 1106, the location server (e.g., the processing system 401 in conjunction with the positioning module 424) determines the position of the UE based at least in part on the first measurement, the second measurement, the identification of the first PRS configuration, the identification of the second PRS configuration, a location of the first eNB, and a location of the second eNB, as at stage 624. Means for performing the functionality of blocks 1102-1106 may, but not necessarily, include, for example, communication device 404, positioning module 424, processing system 401, volatile memory 402, and/or nonvolatile memory 403.

The method 1100 may include additional actions in some aspects. In one aspect, the method 1100 may further include receiving, by the location server from the first eNB, the first PRS configuration of the plurality of PRS configurations (e.g., as at stage 604), and receiving, from the second eNB, the second PRS configuration of the plurality of PRS configurations (e.g., as at stage 602).

In another aspect, the method 1100 may further include receiving, at the location server from the UE, a third measurement of a third PRS for a third PRS configuration of the plurality of PRS configurations and an identification of the third PRS configuration, where the third PRS is transmitted by a third eNB for a third secondary cell of the plurality of secondary cells at a third positioning occasion of the common set of positioning occasions. In this aspect, the method 1100 may further include determining, by the location server, the position of the UE based at least in part on the third measurement, the identification of the third PRS configuration, and a location of the third eNB.

In an aspect, the first eNB, the second eNB, and the third eNB, or some combination thereof, may be the same eNB, and the first secondary cell, the second secondary cell, and the third secondary cell, or some combination thereof, may be different cells, or sectors, of the same eNB. Alternatively, they may be different eNBs.

Figure 12:
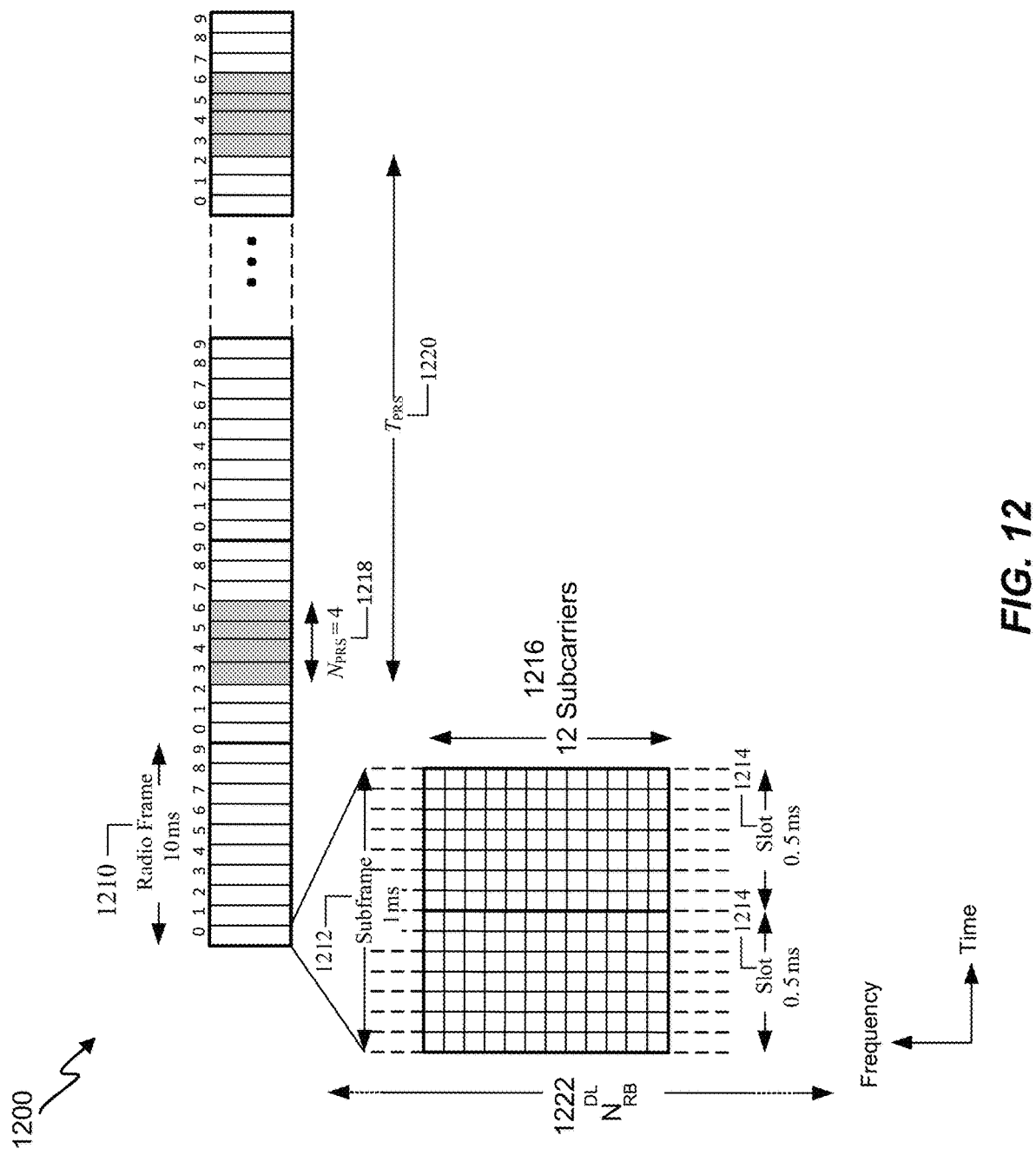
FIG. 12 is a diagram of a structure of an example LTE subframe sequence with PRS positioning occasions.

FIG. 12 shows a structure of an example LTE subframe sequence 1200 with PRS positioning occasions. Subframe sequence 1200 may be applicable to broadcast of PRS signals from eNBs 110A-110D in communication systems 100 and 200. While FIG. 12 provides an example of a subframe sequence for LTE, similar subframe sequence implementations may be realized for other communication technologies/protocols, such as 5G and NR. In FIG. 12, time is represented horizontally (e.g., on an X axis) with time increasing from left to right, while frequency is represented vertically (e.g., on a Y axis) with frequency increasing (or decreasing) from bottom to top. As shown in FIG. 12, downlink and uplink LTE Radio Frames 1210 may be of 10 ms duration each. For downlink Frequency Division Duplex (FDD) mode, Radio Frames 1210 are organized, in the illustrated embodiments, into ten subframes 1212 of 1 ms duration each. Each subframe 1212 comprises two slots 1214, each of, for example, 0.5 ms duration.

In the frequency domain, the available bandwidth may be divided into uniformly spaced orthogonal subcarriers 1216. For example, for a normal length cyclic prefix using, for example, 15 kHz spacing, subcarriers 1216 may be grouped into a group of twelve (12) subcarriers. Each grouping, which comprises the 12 subcarriers 1216, is termed a resource block and, in the example above, the number of subcarriers in the resource block may be written as $N_{SC}^{RB}=12$. For a given channel bandwidth, the number of available resource blocks on each channel 1222, which is also called the transmission bandwidth configuration 1222, is indicated as $N_{RB}^{DL}$. For example, for a 3 MHz channel bandwidth in the above example, the number of available resource blocks on each channel 1222 is given by $N_{RB}^{DL}=15$.

In the communication systems 100 and 200 illustrated in FIGS. 1 and 2, an eNB 110, such as macro cell eNB 110A or any of secondary cell eNBs 110B-110D, may transmit frames, or other physical layer signaling sequences, supporting PRS signals (i.e. a downlink (DL) PRS) according to frame configurations either similar to, or the same as that, shown in FIG. 12 and (as described later) in FIG. 13, which may be measured and used for UE (e.g., UE 120) position determination. As noted, other types of wireless nodes and base stations (e.g., a gNB or WiFi AP) may also be configured to transmit PRS signals configured in a manner similar to (or the same as) that depicted in FIGS. 12 and 13. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g., eNBs 110) after appropriate configuration (e.g., by an Operations and Maintenance (O&M) server). A PRS may be transmitted in special positioning subframes that are grouped into positioning occasions. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 12 illustrates a periodicity of positioning occasions where $N_{PRS}$ equals 4 1218 and $T_{PRS}$ is greater than or equal to 20 1220. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and TOA and RSTD measurement, by UEs (such as the UE 120 depicted in FIGS. 1-3 and 5-6), of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using LPP) to a UE using bit strings. For example, in a bit string signaled to indicate a muting pattern, if a bit at position j is set to '0', then the UE may infer that the PRS is muted for a $j^{4th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID for a cell or other transmission point (TP) (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

As discussed herein (e.g., for stage 512 of signaling flow 500 and stage 612 of signaling flow 600), in some embodiments, OTDOA assistance data may be provided to a UE 120 by a location server 170 for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method (e.g., ECID).

PRS-based positioning by a UE 120 may be facilitated by indicating the serving cell for the UE 120 in the OTDOA assistance data (e.g., with the reference cell indicated as being the serving cell).

In some embodiments, OTDOA assistance data may also include "expected RSTD" parameters, which provide the UE 120 with information about the RSTD values the UE 120 is expected to measure at its current location between the reference cell and each neighbor cell, together with an uncertainty of the expected RSTD parameter. The expected RSTD, together with the associated uncertainty, may define a search window for the UE 120 within which the UE 120 is expected to measure the RSTD value. OTDOA assistance information may also include PRS configuration information parameters, which allow a UE 120 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the RSTD measurements, the known absolute or relative transmission timing of each cell, and the known position(s) of wireless node physical transmitting antennas for the reference and neighboring cells, the UE 120's position may be calculated (e.g., by the UE 120 or by the location server 170). More particularly, the RSTD for a neighbor cell "k" relative to a reference cell "Ref", may be given as ($TOA_k - TOA_{Ref}$), where the TOA values may be measured modulo one subframe duration (1 ms) to remove the effects of measuring different subframes at different times. TOA measurements for different cells may then be converted to RSTD measurements (e.g., as defined in 3GPP TS 36.214 entitled "Physical layer; Measurements") and sent to the location server 170 by the UE 120. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 120's position may be determined.

Figure 13:
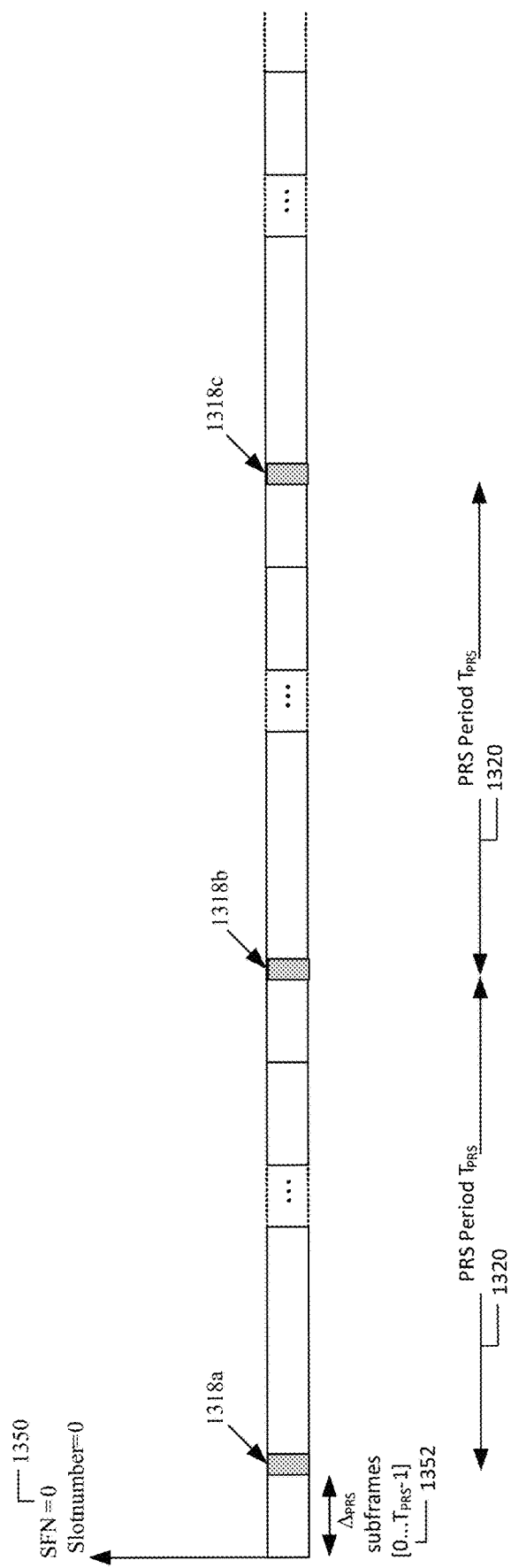
FIG. 13 is a diagram illustrating further aspects of PRS transmission for a cell supported by a wireless node.

FIG. 13 illustrates further aspects of PRS transmission for a cell supported by a wireless node (such as an eNB 110). Again, PRS transmission for LTE is assumed in FIG. 13 although the same or similar aspects of PRS transmission to those shown in and described for FIG. 13 may apply to 5G, NR and/or other wireless technologies. FIG. 13 shows how PRS positioning occasions are determined by a System Frame Number (SFN), a cell specific subframe offset ($\Delta_{PRS}$)) and the PRS Periodicity ($T_{PRS}$) 1320. Typically, the cell specific PRS subframe configuration is defined by a "PRS Configuration Index" $I_{PRS}$ included in the OTDOA assistance data. The PRS Periodicity ($T_{PRS}$) 1320 and the cell specific subframe offset ($\Delta_{PRS}$) are defined based on the PRS Configuration Index $I_{PRS}$, in 3GPP TS 36.211 entitled "Physical channels and modulation," as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0–159 | 160 | $I_{PRS}$ |
| 160–479 | 320 | $I_{PRS}$-160 |
| 480–1119 | 640 | $I_{PRS}$-480 |
| 1120–2399 | 1280 | $I_{PRS}$-1120 |
| 2400–2404 | 5 | $I_{PRS}$-2400 |
| 2405–2414 | 10 | $I_{PRS}$-2405 |
| 2415–2434 | 20 | $I_{PRS}$-2415 |
| 2435–2474 | 40 | $I_{PRS}$-2435 |
| 2475–2554 | 80 | $I_{PRS}$-2475 |
| 2555–4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \qquad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 13, the cell specific subframe offset $\Delta_{PRS}$ 1352 may be defined in terms of the number of subframes transmitted starting from System Frame Number 0 (Slot 'Number 0', marked as slot 1350) to the start of the first (subsequent) PRS positioning occasion. In the example in FIG. 13, the number of consecutive positioning subframes ($N_{PRS}$) in each of the consecutive PRS positioning occasions 1318a, 1318b and 1318c equals 4.

In some embodiments, when a UE 120 receives a PRS configuration index $I_{PRS}$ in the OTDOA assistance data for a particular cell, the UE 120 may determine the PRS periodicity $T_{PRS}$ and PRS subframe offset $\Delta_{PRS}$ using Table 1. The UE 120 may then determine the radio frame, subframe and slot when a PRS is scheduled in the cell (e.g., using equation (1)). The OTDOA assistance data may be determined by, for example, the location server 170, and includes assistance data for a reference cell, and a number of neighbor cells supported by various wireless nodes.

Typically, PRS occasions from all cells in a network that use the same frequency are aligned in time and may have a fixed known time offset relative to other cells in the network that use a different frequency. In SFN-synchronous networks all wireless nodes (e.g., eNBs 110) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 120 may determine the timing of the PRS occasions (e.g., in an LTE network such as that in communication system 200) of the reference and neighbor cells for OTDOA positioning, if the UE 120 can obtain the cell timing (e.g., SFN or Frame Number) of at least one of the cells, e.g., the reference cell or a serving cell. The timing of the other cells may then be derived by the UE 120 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS (e.g., as described in association with FIGS. 1-5) may be configured as just described according to 3GPP TSs and may, for example, use a low PRS duty cycle (e.g., $N_{PRS}=1$, $T_{PRS}=160$ subframes) or a high duty cycle.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM) memory, flash memory, read-only memory (ROM) memory, erasable programmable read-only memory (EPROM) memory, electronically erasable programmable read-only memory (EEPROM) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for determining a position of a UE communicating over a shared communication medium in unlicensed spectrum.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for assisting a position determination of a user equipment (UE) communicating over a shared communication medium in unlicensed spectrum, comprising:

measuring, by the UE at a first positioning reference signal (PRS) arrival time during a first positioning occasion, a first PRS from a first base station for a first secondary cell of a plurality of secondary cells, wherein the first PRS is received from the first base station on the shared communication medium during a period of time where the first base station has won access to the shared communication medium over other base stations operating on the shared communication medium, and wherein the first PRS is configured according to a PRS configuration;

measuring, by the UE at a second PRS arrival time during a second positioning occasion, a second PRS from a second base station for a second secondary cell of the plurality of secondary cells, wherein the second PRS is received from the second base station on the shared communication medium during a period of time where the second base station has won access to the shared communication medium over other base stations operating on the shared communication medium, and wherein the second PRS is configured according to the PRS configuration used for the first PRS; and reporting, by the UE, separate values for the measurement of the first PRS, the measurement of the second PRS, the first PRS arrival time, and the second PRS arrival time to a location server.

2. The method of claim 1, wherein the first base station reports to the location server a first PRS transmission time at which the first base station transmitted the first PRS, and wherein the second base station reports to the location server a second PRS transmission time at which the second base station transmitted the second PRS.

3. The method of claim 2, wherein:
the location server determines that the UE measured the first PRS from the first base station and the second PRS from the second base station based on the first PRS arrival time and the second PRS arrival time reported by the UE and the first PRS transmission time and the second PRS transmission time reported by the first and second base stations, and
the location server determines the position of the UE based at least in part on the measurement of the first PRS and the measurement of the second PRS and a location of the first base station and a location of the second base station.

4. The method of claim 1, further comprising:
receiving, at the UE, positioning assistance data from the location server, the positioning assistance data including the PRS configuration.

5. The method of claim 4, wherein the positioning assistance data indicates that the first base station and the second base station transmit PRS using different positioning occasions.

6. The method of claim 1, wherein the measurement of the first PRS and the measurement of the second PRS are measurements of a reference signal time difference (RSTD) for Observed Time Of Arrival (OTDOA) positioning for Long Term Evolution (LTE) wireless access.

7. The method of claim 1, further comprising:
measuring, by the UE at a third PRS arrival time during a third positioning occasion, a third PRS from a third base station for a third secondary cell of the plurality of secondary cells, wherein the third PRS is transmitted by the third base station on the shared communication medium based on the third base station winning access to the shared communication medium over other base stations operating on the shared communication medium, and wherein the third PRS is configured according to the PRS configuration used for the first PRS; and
reporting, by the UE, the measurement of the third PRS and the third PRS arrival time to the location server.

8. The method of claim 1, wherein the first base station and the second base station are the same base station and the first secondary cell and the second secondary cell are different cells of the same base station.

9. A method for determining a position of a user equipment (UE) communicating over a shared communication medium in unlicensed spectrum, comprising:
receiving, at a location server from a first base station for a first secondary cell of a plurality of secondary cells, a first positioning reference signal (PRS) transmission time at which the first base station transmitted a first PRS, wherein the first PRS is transmitted by the first base station on the shared communication medium according to a PRS configuration during a period of time where the first base station has won access to the shared communication medium over other base stations operating on the shared communication medium;
receiving, at the location server from a second base station for a second secondary cell of the plurality of secondary cells, a second PRS transmission time at which the second base station transmitted a second PRS, wherein the second PRS is transmitted by the second base station on the shared communication medium according to the PRS configuration used for the first PRS during a period of time where the second base station has won access to the shared communication medium over other base stations operating on the shared communication medium;
receiving, at the location server from the UE, separate values for a first measurement of the first PRS, a second measurement of the second PRS, a first PRS arrival time at which the first measurement was taken, and a second PRS arrival time at which the second measurement was taken;
determining, by the location server, that the UE measured the first PRS from the first base station and the second PRS from the second base station based on the first PRS arrival time, the second PRS arrival time, the first PRS transmission time, and the second PRS transmission time; and
determining, by the location server, the position of the UE based at least in part on the first measurement, the second measurement, a location of the first base station, and a location of the second base station.

10. The method of claim 9, further comprising:
receiving, by the location server, the PRS configuration from the first base station, the second base station, or from both base stations.

11. The method of claim 9, further comprising:
sending, by the location server, positioning assistance data to the UE, the positioning assistance data including the PRS configuration.

12. The method of claim 11, wherein the positioning assistance data indicates that the first base station and the second base station transmit PRS using different positioning occasions.

13. The method of claim 9, further comprising:
receiving, at the location server from a third base station for a third secondary cell for the plurality of secondary cells, a third PRS transmission time at which the third base station transmitted a third PRS, wherein the third PRS is transmitted by the third base station on the shared communication medium according to the PRS configuration used for the first PRS during a period of time where the third base station has won access to the shared communication medium over other base stations operating on the shared communication medium; and
receiving, at the location server from the UE, a third measurement of the third PRS and a third PRS arrival time at which the third measurement was taken.

14. The method of claim 13, further comprising:
receiving, by the location server, the PRS configuration from the third base station.

15. The method of claim 13, further comprising:
- determining, by the location server, that the UE measured the third PRS from the third base station based on the third PRS transmission time and the third PRS arrival time; and
- determining, by the location server, the position of the UE based at least in part on the third measurement and a location of the third base station.

16. The method of claim 9, wherein the measurement of the first PRS and the measurement of the second PRS are measurements of a reference signal time difference (RSTD) for Observed Time Of Arrival (OTDOA) positioning for Long Term Evolution (LTE) wireless access.

17. The method of claim 9, wherein the first base station and the second base station are the same base station and the first secondary cell and the second secondary cell are different cells of the same base station.

18. A method for assisting a position determination of a user equipment (UE) communicating over a shared communication medium in unlicensed spectrum, comprising:
- contending, by a base station for a secondary cell for the UE, for access to the shared communication medium;
- transmitting, by the base station, based on winning access to the shared communication medium over other base stations operating on the shared communication medium, a positioning reference signal (PRS) on the shared communication medium at a positioning occasion according to a PRS configuration; and
- sending, by the base station to a location server associated with the UE, after transmission of the PRS on the shared communication medium, a PRS transmission time at which the base station transmitted the PRS.

19. The method of claim 18, further comprising:
- receiving, at the base station, the PRS configuration from the location server.

20. The method of claim 18, further comprising:
- sending, by the base station, the PRS configuration to the location server.

21. The method of claim 18, further comprising:
- recording, by the base station, the PRS transmission time at which the base station transmitted the PRS.

22. The method of claim 18, further comprising:
- performing a listen before talk procedure to win access to the shared communication medium before transmitting the PRS.

23. The method of claim 18, further comprising:
- receiving a request from the location server for the PRS transmission time at which the base station transmitted the PRS; and
- sending the PRS transmission time to the location server in response to the request.

24. An apparatus for assisting a position determination of a user equipment (UE) communicating over a shared communication medium in unlicensed spectrum, comprising:
- at least one processor of the UE configured to:
  - measure, at a first positioning reference signal (PRS) arrival time during a first positioning occasion, a first PRS from a first base station for a first secondary cell of a plurality of secondary cells, wherein the first PRS is transmitted by the first base station on the shared communication medium during a period of time where the first base station has won access to the shared communication medium over other base stations operating on the shared communication medium, and wherein the first PRS is configured according to a PRS configuration;
  - measure, at a second PRS arrival time during a second positioning occasion, a second PRS from a second base station for a second secondary cell of the plurality of secondary cells, wherein the second PRS is transmitted by the second base station on the shared communication medium during a period of time where the second base station has won access to the shared communication medium over other base stations operating on the shared communication medium, and wherein the second PRS is configured according to the PRS configuration used for the first PRS; and
  - cause a transceiver of the UE to report separate values for the measurement of the first PRS, the measurement of the second PRS, the first PRS arrival time, and the second PRS arrival time to a location server.

25. The apparatus of claim 24, wherein the first base station reports to the location server a first PRS transmission time at which the first base station transmitted the first PRS, and wherein the second base station reports to the location server a second PRS transmission time at which the second base station transmitted the second PRS.

26. The apparatus of claim 25, wherein:
- the location server determines that the UE measured the first PRS from the first base station and the second PRS from the second base station based on the first PRS arrival time and the second PRS arrival time reported by the UE and the first PRS transmission time and the second PRS transmission time reported by the first and second base stations, and
- the location server determines the position of the UE based at least in part on the measurement of the first PRS and the measurement of the second PRS and a location of the first base station and a location of the second base station.

27. The apparatus of claim 24, wherein the at least one processor is further configured to:
- receive positioning assistance data from the location server, the positioning assistance data including the PRS configuration.

28. The apparatus of claim 27, wherein the positioning assistance data indicates that the first base station and the second base station transmit PRS using different positioning occasions.

29. The apparatus of claim 24, wherein the measurement of the first PRS and the measurement of the second PRS are measurements of a reference signal time difference (RSTD) for Observed Time Of Arrival (OTDOA) positioning for Long Term Evolution (LTE) wireless access.

30. The apparatus of claim 24, wherein the at least one processor is further configured to:
- measure, at a third PRS arrival time during a third positioning occasion, a third PRS from a third base station for a third secondary cell of the plurality of secondary cells, wherein the third PRS is transmitted by the third base station on the shared communication medium during a period of time where the third base station has won access to the shared communication medium over other base stations operating on the shared communication medium, and wherein the third PRS is configured according to the PRS configuration used for the first PRS; and
- report the measurement of the third PRS and the third PRS arrival time to the location server.

31. The apparatus of claim 24, wherein the first base station and the second base station are the same base station and the first secondary cell and the second secondary cell are different cells of the same base station.

32. An apparatus for determining a position of a user equipment (UE) communicating over a shared communication medium in unlicensed spectrum, comprising:
a communication device of a location server configured to:
receive, from a first base station for a first secondary cell of a plurality of secondary cells, a first positioning reference signal (PRS) transmission time at which the first base station transmitted a first PRS, wherein the first PRS is transmitted by the first base station on the shared communication medium according to a PRS configuration during a period of time where the first base station has won access to the shared communication medium over other base stations operating on the shared communication medium;
receive, from a second base station for a second secondary cell of the plurality of secondary cells, a second PRS transmission time at which the second base station transmitted a second PRS, wherein the second PRS is transmitted by the second base station on the shared communication medium according to the PRS configuration used for the first PRS during a period of time where the second base station has won access to the shared communication medium over other base stations operating on the shared communication medium; and
receive, from the UE, separate values for a first measurement of the first PRS, a second measurement of the second PRS, a first PRS arrival time at which the first measurement was taken, and a second PRS arrival time at which the second measurement was taken; and
at least one processor of the location server configured to:
determine that the UE measured the first PRS from the first base station and the second PRS from the second base station based on the first PRS arrival time and the second PRS arrival time received from the UE and the first PRS transmission time and the second PRS transmission time received from the first base station and the second base station; and
determine the position of the UE based at least in part on the first measurement, the second measurement, a location of the first base station, and a location of the second base station.

33. The apparatus of claim 32, wherein the communication device is further configured to:
receive the PRS configuration from the first base station, the second base station, or from both base stations.

34. The apparatus of claim 32, wherein the communication device is further configured to:
send positioning assistance data to the UE, the positioning assistance data including the PRS configuration.

35. The apparatus of claim 34, wherein the positioning assistance data indicates that the first base station and the second base station transmit PRS using different positioning occasions.

36. The apparatus of claim 32, wherein the communication device is further configured to:
receive, from a third base station for a third secondary cell for the plurality of secondary cells, a third PRS transmission time at which the third base station transmitted a third PRS, wherein the third base station transmits the third PRS on the shared communication medium according to the PRS configuration used for the first PRS during a period of time where the third base station has won access to the shared communication medium over other base stations operating on the shared communication medium; and
receive, from the UE, a third measurement of the third PRS and a third PRS arrival time at which the third measurement was taken.

37. The apparatus of claim 36, wherein the communication device is further configured to:
receive the PRS configuration from the third base station.

38. The apparatus of claim 36, wherein the at least one processor is further configured to:
determine that the UE measured the third PRS from the third base station based on the third PRS transmission time and the third PRS arrival time; and
determine the position of the UE based at least in part on the third measurement and a location of the third base station.

39. The apparatus of claim 32, wherein the measurement of the first PRS and the measurement of the second PRS are measurements of a reference signal time difference (RSTD) for Observed Time Of Arrival (OTDOA) positioning for Long Term Evolution (LTE) wireless access.

40. The apparatus of claim 32, wherein the first base station and the second base station are the same base station and the first secondary cell and the second secondary cell are different cells of the same base station.

41. An apparatus for assisting a position determination of a user equipment (UE) communicating over a shared communication medium in unlicensed spectrum, comprising:
a transceiver of a base station for a secondary cell for the UE configured to:
contend for access to the shared communication medium;
transmit, based on winning access to the shared communication medium over other base stations operating on the shared communication medium, a positioning reference signal (PRS) on the shared communication medium at a positioning occasion according to a PRS configuration; and
send, to a location server associated with the UE, after transmission of the PRS on the shared communication medium, a PRS transmission time at which the base station transmitted the PRS.

42. The apparatus of claim 41, wherein the transceiver is further configured to:
receive the PRS configuration from the location server.

43. The apparatus of claim 41, wherein the transceiver is further configured to:
send the PRS configuration to the location server.

44. The apparatus of claim 41, further comprising:
at least one processor configured to record the PRS transmission time at which the base station transmitted the PRS.

45. The apparatus of claim 41, further comprising:
at least one processor configured to perform a listen before talk procedure to win access to the shared communication medium before transmission of the PRS.

46. The apparatus of claim 41, wherein the transceiver is further configured to:
receive a request from the location server for the PRS transmission time at which the base station transmitted the PRS; and
send the PRS transmission time to the location server in response to the request.

47. A user equipment (UE) apparatus for assisting a position determination of a UE communicating over a shared communication medium in unlicensed spectrum, comprising:

means for measuring, at a first positioning reference signal (PRS) arrival time during a first positioning occasion, a first PRS from a first base station for a first secondary cell of a plurality of secondary cells, wherein the first PRS is transmitted by the first base station on the shared communication medium during a period of time where the first base station has won access to the shared communication medium over other base stations operating on the shared communication medium, and wherein the first PRS is configured according to a PRS configuration;

means for measuring, at a second PRS arrival time during a second positioning occasion, a second PRS from a second base station for a second secondary cell of the plurality of secondary cells, wherein the second PRS is transmitted by the second base station on the shared communication medium during a period of time where the second base station has won access to the shared communication medium over other base stations operating on the shared communication medium, and wherein the second PRS is configured according to the PRS configuration used for the first PRS; and means for reporting separate values for the measurement of the first PRS, the measurement of the second PRS, the first PRS arrival time, and the second PRS arrival time to a location server.

48. A location server apparatus for determining a position of a user equipment (UE) communicating over a shared communication medium in unlicensed spectrum, comprising:

means for receiving, from a first base station for a first secondary cell of a plurality of secondary cells, a first positioning reference signal (PRS) transmission time at which the first base station transmitted a first PRS, wherein the first PRS is transmitted by the first base station on the shared communication medium according to a PRS configuration during a period of time where the first base station has won access to the shared communication medium over other base stations operating on the shared communication medium;

means for receiving, from a second base station for a second secondary cell of the plurality of secondary cells, a second PRS transmission time at which the second base station transmitted a second PRS, wherein the second PRS is transmitted by the second base station on the shared communication medium according to the PRS configuration used for the first PRS during a period of time where the second base station has won access to the shared communication medium over other base stations operating on the shared communication medium;

means for receiving, from the UE, separate values for a first measurement of the first PRS, a second measurement of the second PRS, a first PRS arrival time at which the first measurement was taken, and a second PRS arrival time at which the second measurement was taken;

means for determining that the UE measured the first PRS from the first base station and the second PRS from the second base station based on the first PRS transmission time, the second PRS transmission time, the first PRS arrival time, and the second PRS arrival time; and means for determining the position of the UE based at least in part on the first measurement, the second measurement, a location of the first base station, and a location of the second base station.

49. A base station apparatus for a secondary cell for a user equipment (UE) for assisting a position determination of the UE communicating over a shared communication medium in unlicensed spectrum, comprising:

means for contending for access to the shared communication medium;

means for transmitting, based on winning access to the shared communication medium over other base stations operating on the shared communication medium, a positioning reference signal (PRS) on the shared communication medium at a positioning occasion according to a PRS configuration; and means for sending, to a location server associated with the UE, after transmission of the PRS on the shared communication medium, a PRS transmission time at which the base station transmitted the PRS.

50. A non-transitory computer-readable medium storing computer-executable instructions for assisting a position determination of a user equipment (UE) communicating over a shared communication medium in unlicensed spectrum, the computer-executable instructions comprising:

at least one instruction instructing the UE to measure, at a first PRS arrival time during a first positioning occasion, a first positioning reference signal (PRS) from a first base station for a first secondary cell of a plurality of secondary cells, wherein the first PRS is transmitted by the first base station on the shared communication medium during a period of time where the first base station has won access to the shared communication medium over other base stations operating on the shared communication medium, and wherein the first PRS is configured according to a PRS configuration;

at least one instruction instructing the UE to measure, at a second PRS arrival time during a second positioning occasion, a second PRS from a second base station for a second secondary cell of the plurality of secondary cells, wherein the second PRS is transmitted by the second base station on the shared communication medium during a period of time where the second base station has won access to the shared communication medium over other base stations operating on the shared communication medium, and wherein the second PRS is configured according to the PRS configuration used for the first PRS; and at least one instruction instructing the UE to report separate values for the measurement of the first PRS, the measurement of the second PRS, the first PRS arrival time, and the second PRS arrival time to a location server.

51. A non-transitory computer-readable medium storing computer-executable instructions for determining a position of a user equipment (UE) communicating over a shared communication medium in unlicensed spectrum, the computer-executable instructions comprising:

at least one instruction instructing a location server to receive, from a first base station for a first secondary cell of a plurality of secondary cells, a first PRS transmission time at which the first base station transmitted a first positioning reference signal (PRS), wherein the first PRS is transmitted by the first base station on the shared communication medium according to a PRS configuration during a period of time where the first base station has won access to the shared communication medium over other base stations operating on the shared communication medium;

at least one instruction instructing the location server to receive, from a second base station for a second secondary cell of the plurality of secondary cells, a second PRS transmission time at which the second base station transmitted a second PRS, wherein the second PRS is transmitted by the second base station on the shared communication medium according to the PRS configuration used for the first PRS during a period of time where the second base station has won access to the shared communication medium over other base stations operating on the shared communication medium;

at least one instruction instructing the location server to receive, from the UE, separate values for a first measurement of the first PRS, a second measurement of the second PRS, a first PRS arrival time at which the first measurement was taken, and a second PRS arrival time at which the second measurement was taken;

at least one instruction instructing the location server to determine that the UE measured the first PRS from the first base station and the second PRS from the second base station based on the first PRS transmission time, the second PRS transmission time, the first PRS arrival time, and the second PRS arrival time; and at least one instruction instructing the location server to determine the position of the UE based at least in part on the first measurement, the second measurement, a location of the first base station, and a location of the second base station.

52. A non-transitory computer-readable medium storing computer-executable instructions for assisting a position determination of a user equipment (UE) communicating over a shared communication medium in unlicensed spectrum, the computer-executable instructions comprising:

at least one instruction instructing a base station for a secondary cell for the UE to contend for access to the shared communication medium;

at least one instruction instructing the base station to transmit, based on winning access to the shared communication medium over other base stations operating on the shared communication medium, a positioning reference signal (PRS) on the shared communication medium at a positioning occasion according to a PRS configuration; and at least one instruction instructing the base station to send, to a location server associated with the UE, after transmission of the PRS on the shared communication medium, a PRS transmission time at which the base station transmitted the PRS.

* * * * *